United States Patent
Hirokubo et al.

(10) Patent No.: US 10,113,909 B2
(45) Date of Patent: Oct. 30, 2018

(54) OPTICAL FILTER DEVICE, OPTICAL MODULE, AND ELECTRONIC EQUIPMENT

(71) Applicant: Seiko Epson Corporation, Tokyo (JP)

(72) Inventors: Nozomu Hirokubo, Matsumoto (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 127 days.

(21) Appl. No.: 14/757,402

(22) Filed: Dec. 23, 2015

(65) Prior Publication Data

US 2016/0187197 A1   Jun. 30, 2016

(30) Foreign Application Priority Data

Dec. 26, 2014  (JP) .................................. 2014-264020

(51) Int. Cl.
  *G01J 3/12*  (2006.01)
  *G02B 5/28*  (2006.01)
  *G01J 3/28*  (2006.01)

(52) U.S. Cl.
  CPC . *G01J 3/12* (2013.01); *G01J 3/28* (2013.01); *G02B 5/284* (2013.01); *G01J 2003/1226* (2013.01)

(58) Field of Classification Search
  CPC ...................................................... G02B 5/284
  See application file for complete search history.

(56) References Cited

U.S. PATENT DOCUMENTS

| 6,985,281 B2 | 1/2006 | Wagner et al. |
| 7,514,685 B2 | 4/2009 | Yoshida |
| 2007/0097479 A1 | 5/2007 | Yasuda |
| 2009/0282915 A1 | 11/2009 | Ohta et al. |
| 2009/0320593 A1 | 12/2009 | Nakashio et al. |
| 2009/0323165 A1 | 12/2009 | Sampsell |
| 2012/0120402 A1 | 5/2012 | Hirokubo et al. |
| 2012/0194821 A1 | 8/2012 | Nozawa |
| 2012/0206731 A1 | 8/2012 | Sano et al. |
| 2012/0312094 A1 | 12/2012 | Uchida et al. |
| 2013/0075596 A1 | 3/2013 | Matsuno et al. |
| 2013/0208359 A1 | 8/2013 | Matsuno et al. |
| 2013/0308134 A1 | 11/2013 | Hirokubo |
| 2014/0177058 A1 | 6/2014 | Koike |
| 2014/0285895 A1 | 9/2014 | Saito et al. |
| 2015/0029590 A1 | 1/2015 | Hirokubo |

FOREIGN PATENT DOCUMENTS

| CN | 102621613 A | 8/2012 |
| CN | 103424865 A | 12/2013 |
| JP | H06-241898 A | 9/1994 |

(Continued)

OTHER PUBLICATIONS

Extended European Search Report for EP Application No. 15202385.9, dated May 27, 2016 (9 pages).

*Primary Examiner* — Tony Ko
(74) *Attorney, Agent, or Firm* — Harness, Dickey & Pierce, P.L.C.

(57) ABSTRACT

A variable wavelength interference filter is fixed to the base, and the fixing material fixes at least one of the substrates to the base via at least one location of one surface side along a substrate thickness direction. A first order resonance frequency of the variable wavelength interference filter in which a fixing position of the fixing material is used as a fixed end is less than or equal to half a value of a first order resonance frequency of the movable section.

6 Claims, 27 Drawing Sheets

(56) References Cited

FOREIGN PATENT DOCUMENTS

| | | |
|---|---|---|
| JP | 2005-510756 A | 4/2005 |
| JP | 2006-042005 A | 2/2006 |
| JP | 2007-152501 A | 6/2007 |
| JP | 2008-070163 A | 3/2008 |
| JP | 2013-072981 A | 4/2013 |
| JP | 2013-153345 A | 8/2013 |
| JP | 2013-167701 A | 8/2013 |
| JP | 2015-025942 A | 2/2015 |
| JP | 2016-012097 A | 1/2016 |
| WO | WO-03-046630 A1 | 6/2003 |
| WO | WO-2008-001908 A1 | 1/2008 |

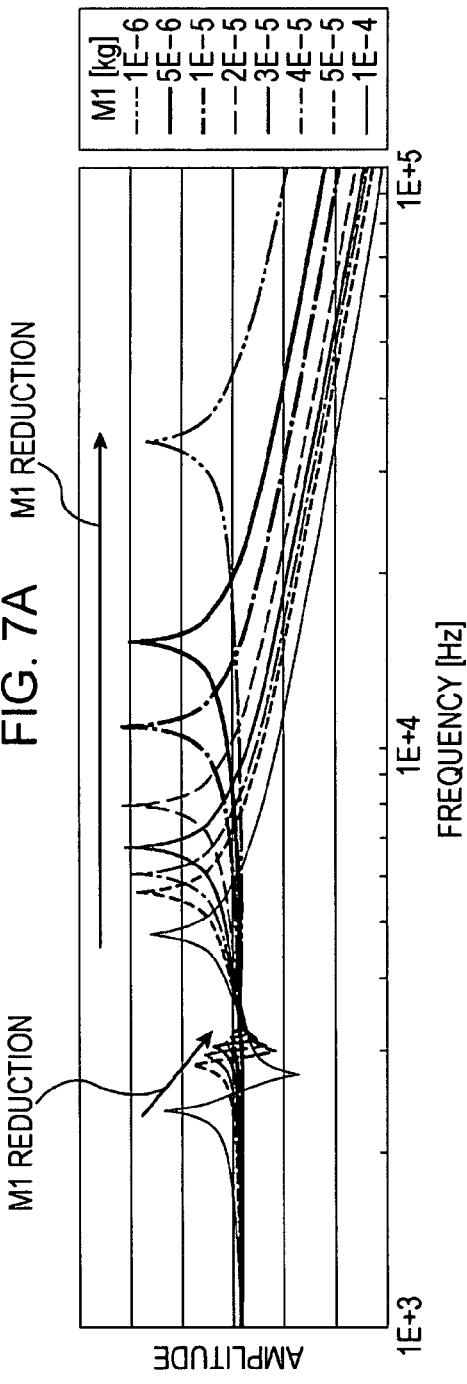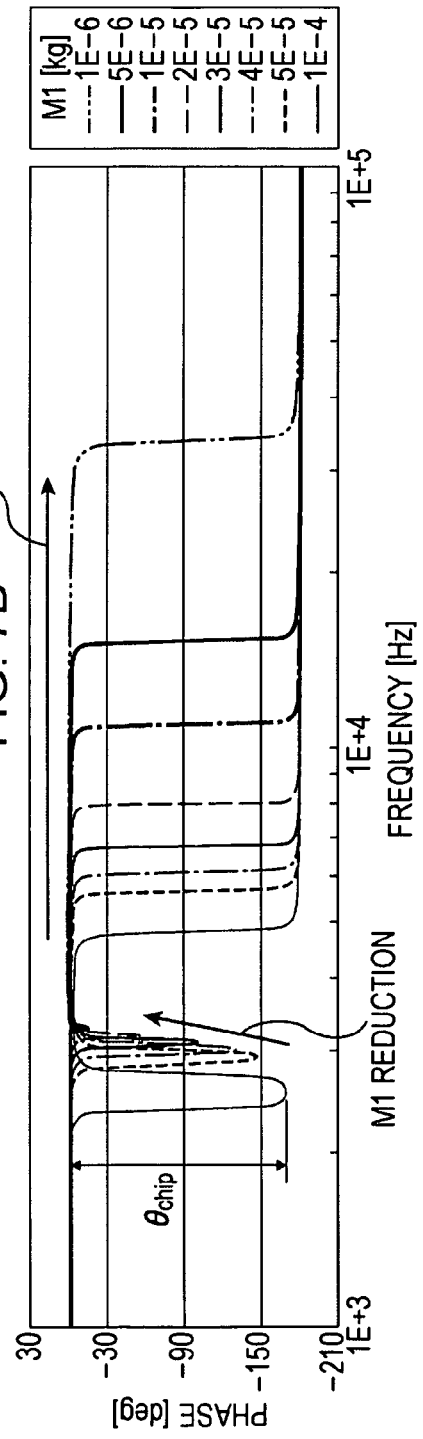

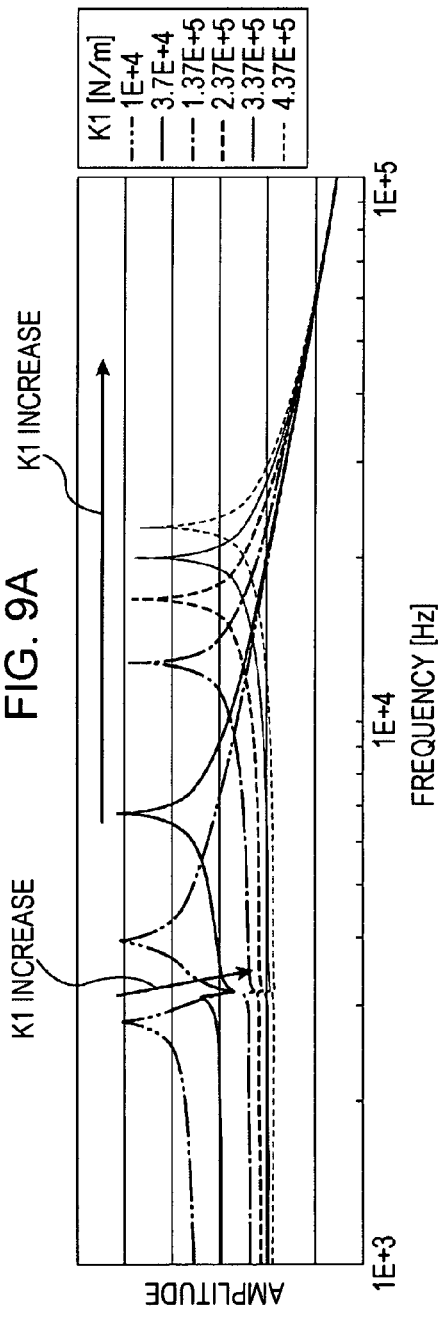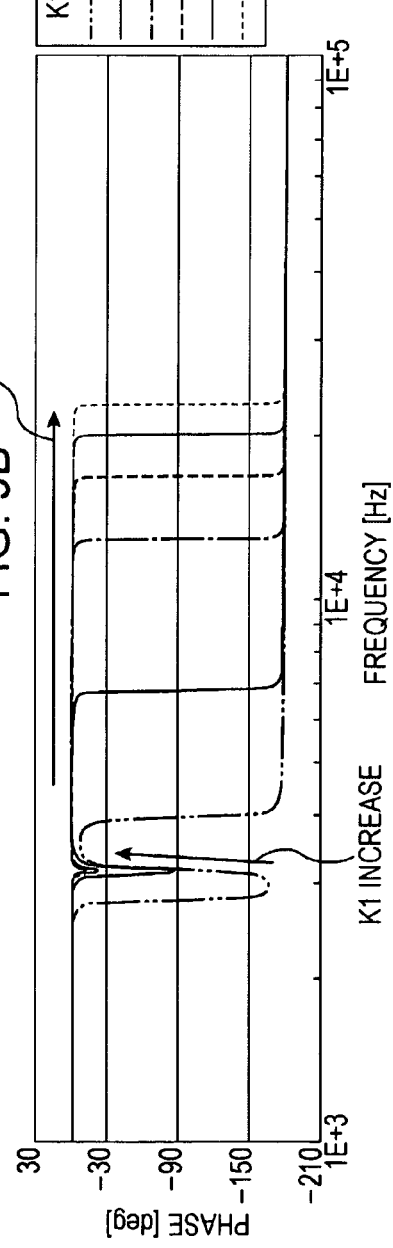

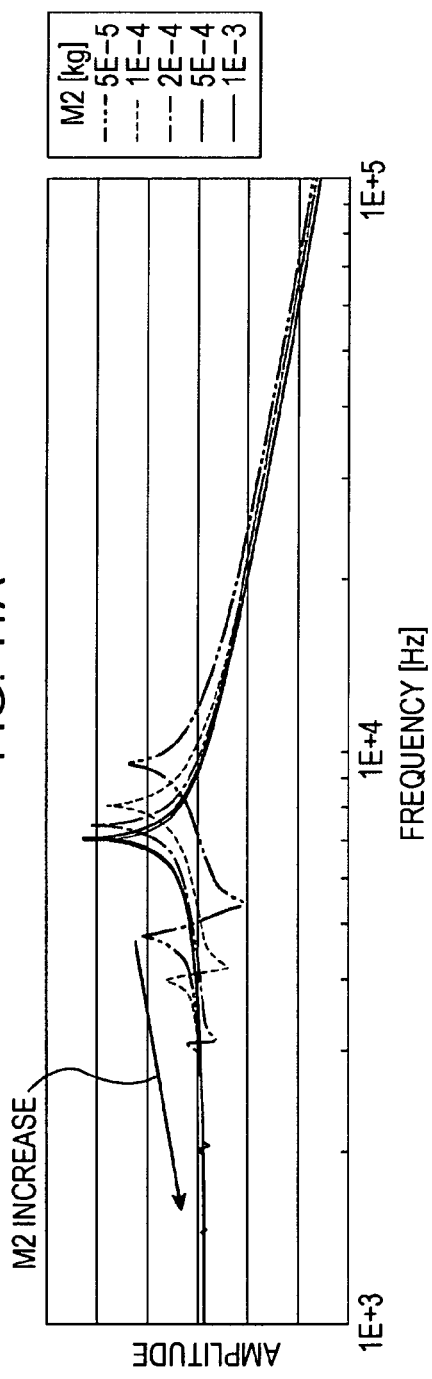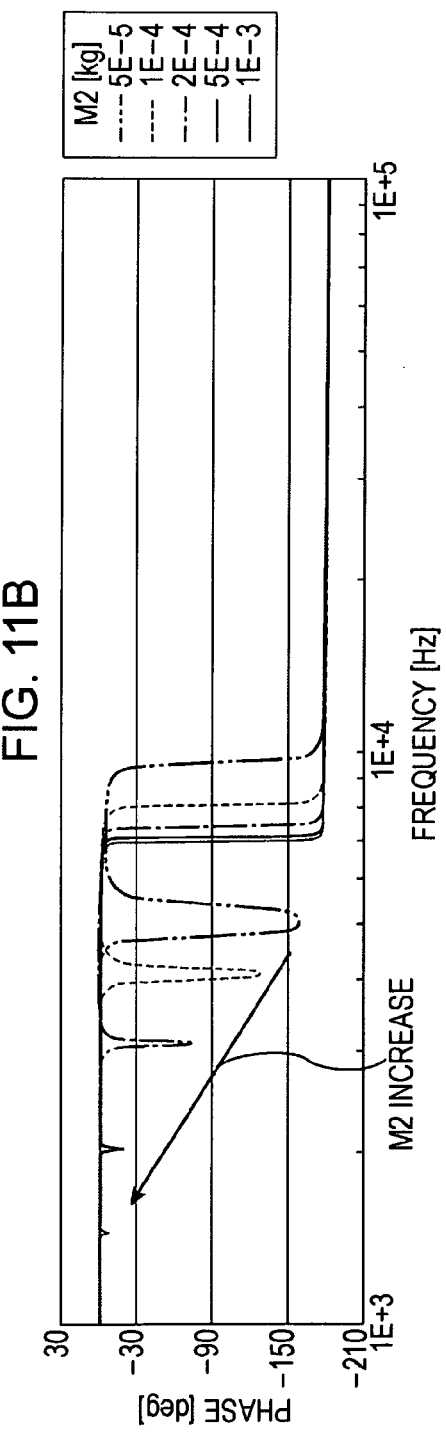

OPTICAL FILTER DEVICE, OPTICAL MODULE, AND ELECTRONIC EQUIPMENT

BACKGROUND

1. Technical Field

The present invention relates to an optical filter device, an optical module, and electronic equipment.

2. Related Art

In the related art, there is known an optical filter device having an interference filter stored inside a housing. In the interference filter, reflective films which face each other via a predetermined gap are disposed on respective surfaces of a pair of substrates which face each other (for example, refer to JP-A-2013-167701).

In the optical filter device described in JP-A-2013-167701, the housing is provided with a base substrate to which an interference filter is fixed by a fixing member. An opposing surface of the substrate of the interference filter which faces the base substrate is adhesively fixed to the base substrate via at least one location of one surface side along a substrate thickness direction, that is, one side of the interference filter.

In the optical filter device, for example, even when the adhesive fixing is performed using an adhesive, it is possible to reduce the stress from the adhesive in comparison to a configuration in which substantially the whole surface of the opposing surface of the substrate is adhered. In other words, it is possible to suppress the influence of tensile stress from the adhesive which contracts during the curing or the stress which is generated by a thermal expansion coefficient difference between the substrate and the base substrate more the smaller the adhesion surface area of the opposing surface of the substrate.

However, since the interference filter is fixed via at least one location of one side of the substrate of the interference filter, for example, when a disturbance of a frequency which is close to the natural frequency of the interference filter is applied to the optical filter device, the interference filter may vibrate centered on the fixing location. When such vibration occurs, the dimension of the gap between the reflective films may fluctuate and the resolution of the interference filter may be reduced.

SUMMARY

An advantage of some aspects of the invention is to provide an optical filter device, an optical module, and electronic equipment, each of which is capable of suppressing a reduction in the resolution of an interference filter.

According to an application example, there is provided an optical filter device which includes an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film, a base section to which the interference filter is fixed, and a fixing member which fixes at least one of the first substrate and the second substrate to the base section via at least one location of one surface side along a substrate thickness direction, in which a one-dimensional resonance frequency of the interference filter in which a fixing position of the fixing member is used as a fixed end is less than or equal to half a value of a one-dimensional resonance frequency of the movable section.

Here, one surface side along the substrate thickness direction includes not only one surface (side surface) along the substrate thickness direction, but also a region in the vicinity of the one side surface in a surface intersecting the aforementioned one side surface. In other words, in the present application example, the fixing member is provided in at least one location on a side surface of at least one of the first substrate and the second substrate, and in the vicinity thereof. For example, when the substrates are rectangular, one side of the interference filter is fixed to the base section by the fixing member as viewed from the substrate thickness direction.

In the present application example, the interference filter is configured to be capable of changing the gap dimension between the pair of reflective films by causing the movable section which is provided on the second substrate of the pair of substrates to approach and withdraw from the first substrate. In the optical filter device, the interference filter is fixed to the base section via at least one location of the surface side along the substrate thickness direction. In this case, one-dimensional resonance vibration (the chip vibration), in which a position which is furthest from the fixed end is a free end, may occur.

To address this, in the present application example, since the one-dimensional resonance frequency (the chip resonance frequency) of the chip vibration is set to less than or equal to half the value of the one-dimensional resonance frequency (the mirror resonance frequency) of the movable section, even when the chip vibration is excited by a disturbance or the like, it is possible to suppress the occurrence of the resonance (the mirror vibration) of the movable section being excited by the chip vibration, and it is possible to suppress the fluctuation of the gap dimension. Therefore, it is possible to suppress a reduction in the resolution of the interference filter caused by the fluctuation of the gap dimension.

In the optical filter device according to the application example, it is preferable that the fixing member has an elastic modulus of less than or equal to a first threshold at which the fixing member elastically deforms due to a stress that corresponds to a rotation of the interference filter centering on the fixing position.

In the present application example, the elastic modulus of the fixing member is set to less than or equal to the first threshold at which the fixing member elastically deforms according to the stress corresponding to the rotation of the interference filter caused by the chip vibration. Here, the first threshold is an upper limit value of the elastic modulus at which the fixing member is capable of elastic deformation corresponding to the chip vibration.

In this case, it is possible to reduce the chip resonance frequency, and, it is possible to suppress the chip vibration using the elastic deformation of the fixing member. Therefore, it is possible to suppress the occurrence of the mirror vibration being excited by the chip vibration.

In the optical filter device according to the application example, it is preferable that a ratio of a mass of the movable section to a mass of the interference filter excluding the movable section is less than or equal to a second threshold at which the one-dimensional resonance frequency of the interference filter is set to half a value of the one-dimensional resonance frequency of the movable section.

In the present application example, by reducing the mass of the movable section in relation to the mass of the interference filter excluding the movable section to set the ratio of the mass of the movable section to the mass of the interference filter excluding the movable section to less than or equal to the second threshold, it is possible to increase the difference between the chip resonance frequency and the mirror resonance frequency, and it is possible to suppress the occurrence of the mirror vibration being excited by the chip vibration.

In the optical filter device according to the application example, it is preferable that the second substrate includes a holding section which holds the movable section, and the movable section approaches and withdraws from the first substrate corresponding to deformation of the holding section, and, when a mass of the interference filter is X times a mass of the movable section, a rigidity of the fixing member is less than a value obtained by multiplying a rigidity of the holding section by X/4.

In the present application example, the movable section approaches and withdraws due to the holding section which holds the movable section being deformed. In this case, by setting the rigidity of the fixing member to a smaller value than a value obtained by multiplying the rigidity of the holding section by X/4, it is possible to set the chip resonance frequency to less than or equal to half the value of the mirror resonance frequency, and it is possible to suppress the occurrence of the mirror vibration being excited by the chip vibration. Therefore, even if the chip vibration occurs due to a disturbance or the like, it is possible to suppress the excitation of the mirror vibration due to the fixing member being allowed to elastically deform more than the holding section corresponding to the chip vibration, and it is possible to attenuate the chip vibration. Therefore, it is possible to more reliably suppress the occurrence of the mirror vibration being excited according to the chip vibration.

According to another application example, there is provided an optical module including an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film, a base section to which the interference filter is fixed, a fixing member which fixes at least one of the first substrate and the second substrate to the base section via at least one location of one surface side along a substrate thickness direction, and a detection section which detects light extracted by the interference filter, in which a one-dimensional resonance frequency of the interference filter in which a fixing position of the fixing member is used as a fixed end is less than or equal to half a value of a one-dimensional resonance frequency of the movable section.

In the present application example, as described above, it is possible to suppress a reduction in the resolution of the interference filter in the optical filter device, and it is possible to cause light to be emitted from the optical filter device in a state in which the resolution is maintained. Therefore, in the optical module, it is possible to detect the light quantity of the light of a desired wavelength at a high resolution using the light reception section.

In the optical module according to the application example, it is preferable that the interference filter includes the gap changing section which changes the gap dimension between the first reflective film and the second reflective film by causing the movable section to approach and withdraw, and that the optical module further includes a feedback loop which includes the interference filter, a gap detection section that detects a gap dimension between the first reflective film and the second reflective film, and a feedback control section that applies a feedback voltage corresponding to a detection result of the gap detection section and a target value of the gap dimension to a gap changing section.

In the present application example, the feedback loop is formed of the variable wavelength interference filter, the gap detection section, and the feedback control section, and the feedback control section carries out the feedback control of the gap changing section according to the detection result of the gap dimension which is obtained by the gap detection section.

In this case, the phase variation caused by the variable wavelength interference filter and the feedback control section in the feedback loop, that is, the phase delay is 180°, and when the loop gain is greater than 1, vibration occurs.

To address this, in the present application example, by setting the chip resonance frequency to less than or equal to half the value of the mirror resonance frequency, it is possible to set the maximum value (the maximum phase rotation angle) of the phase variation amount caused by the interference filter to less than 90°. Accordingly, it is possible to suppress the vibration.

According to still another application example, there is provided electronic equipment which includes an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film, a base section to which the interference filter is fixed, a fixing member which fixes at least one of the first substrate and the second substrate to the base section via at least one location of one surface side along a substrate thickness direction, and a processing section which carries out a process based on light extracted by the interference filter, in which a one-dimensional resonance frequency of the interference filter in which a fixing position of the fixing member is used as a fixed end is less than or equal to half a value of a one-dimensional resonance frequency of the movable section.

In the present application example, as described above, it is possible to suppress a reduction in the resolution of the interference filter in the optical filter device, and it is possible to cause light to be emitted from the optical filter device in a state in which the resolution is maintained. Therefore, it is possible to provide electronic equipment capable of carrying out a high precision process based on the high resolution light which is output from the optical filter device.

BRIEF DESCRIPTION OF THE DRAWINGS

The invention will be described with reference to the accompanying drawings, wherein like numbers reference like elements.

FIGS. 7A and 7B are graphs illustrating frequency characteristics relating to M1 when parametric analysis is carried out.

FIGS. 9A and 9B are graphs illustrating frequency characteristics relating to K1 when parametric analysis is carried out.

FIGS. 11A and 11B are graphs illustrating frequency characteristics relating to M2 when parametric analysis is carried out.

DESCRIPTION OF EXEMPLARY EMBODIMENTS

Hereinafter, description will be given of an embodiment of the invention based on the drawings.

Configuration of Spectroscopy Device

Figure 1:
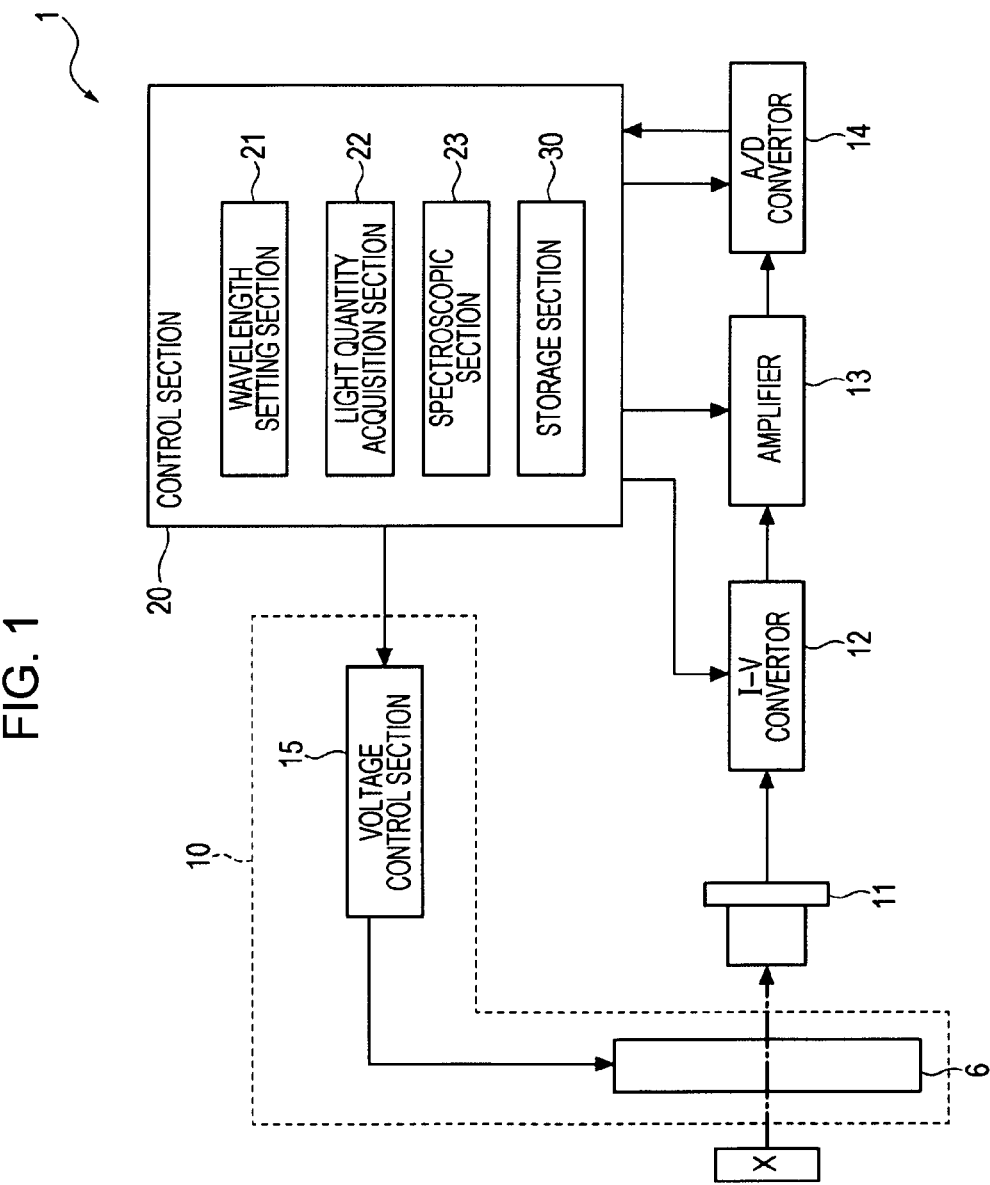
FIG. 1 is a block diagram illustrating the schematic configuration of a spectroscopy device of an embodiment of the invention.

FIG. 1 is a block diagram illustrating the schematic configuration of a spectroscopy device of an embodiment of the invention.

A spectroscopy device 1 is a device which analyses the light intensity of a predetermined wavelength in measurement target light which is reflected by a measurement target X and measures the optical spectrum. Note that, in the present embodiment, although an example is given in which the measurement target light which is reflected by the measurement target X is measured, light which is emitted from a light emitting body when using a light emitting body such as a liquid crystal display as the measurement target X, for example, may be used as the measurement target light.

As illustrated in FIG. 1, the spectroscopy device 1 is provided with an optical module 10, a detector 11 (a detection section), an I-V converter 12, an amplifier 13, an A/D converter 14, and a control section 20.

The optical module 10 is configured to include an optical filter device 6 and a voltage control section 15.

The optical filter device 6 is provided with a variable wavelength interference filter 5 (refer to FIG. 2) which corresponds to the interference filter of the invention. The variable wavelength interference filter 5 includes a pair of reflective films and detects light of a wavelength corresponding to the gap dimension between the reflective films. The variable wavelength interference filter 5 is provided with an electrostatic actuator 56 (refer to FIG. 2), and the gap dimension between the reflective films is set to a value corresponding to the drive voltage of the electrostatic actuator 56. In other words, the variable wavelength interference filter 5 emits light of a wavelength corresponding to the drive voltage.

The voltage control section 15 applies the drive voltage to the electrostatic actuator 56 based on the control of the control section 20, and allows light of a predetermined intended wavelength to pass through the variable wavelength interference filter 5.

The detector 11 receives the light which passes through the variable wavelength interference filter 5 of the optical module 10 and outputs a detection signal (an electrical current) corresponding to the light intensity of the received light.

The I-V converter 12 converts the detection signal which is input thereto from the detector 11 into a voltage value and outputs the voltage value to the amplifier 13.

The amplifier 13 amplifies the voltage (the detection voltage) which corresponds to the detection signal which is input thereto from the I-V converter 12.

The A/D converter 14 converts the detection voltage (an analog signal) which is input thereto from the amplifier 13 into a digital signal and outputs the digital signal to the control section 20.

Configuration of Control Section

The control section 20 corresponds to a processing section of the invention, is configured by a combination of a CPU, a memory, and the like, for example, and controls the overall operation of the spectroscopy device 1. As illustrated in FIG. 1, the control section 20 is provided with a wavelength setting section 21, a light quantity acquisition section 22, a spectroscopic section 23, and a storage section 30.

Various programs for controlling the spectroscopy device 1 and various data (for example, V-X data or the like illustrating the drive voltage in relation to a target wavelength) are stored in the storage section 30.

The wavelength setting section 21 sets the intended wavelength of light to be extracted by the variable wavelength interference filter 5 and outputs a control signal indicating that the set intended wavelength is to be extracted from the variable wavelength interference filter 5 to the voltage control section 15.

The light quantity acquisition section 22 acquires the light quantity of the light of the intended wavelength which passes through the variable wavelength interference filter 5 based on the light quantity which is acquired by the detector 11.

The spectroscopic section 23 measures the spectral characteristics of the measurement target light based on the light quantity which is acquired by the light quantity acquisition section 22.

Configuration of Optical Module

Next, description will be given hereinafter of the configuration of the optical module 10.

Figure 2:
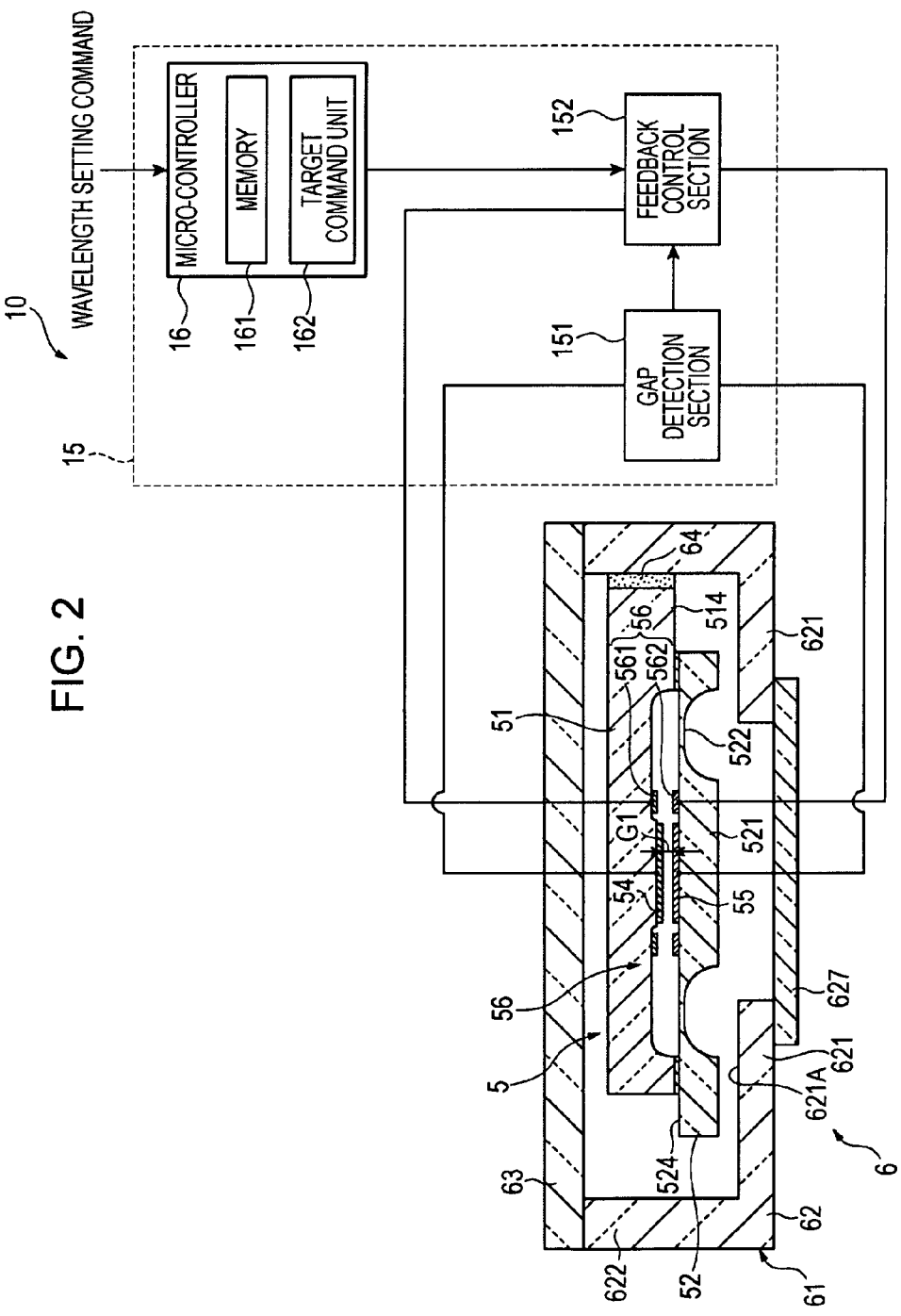
FIG. 2 is a block diagram illustrating the schematic configuration of an optical module.

FIG. 2 is a block diagram illustrating the schematic configuration of the optical module 10.

As described above, the optical module 10 is configured to include the optical filter device 6 and the voltage control section 15. The variable wavelength interference filter 5 is stored in the inner portion of the optical filter device 6.

Configuration of Voltage Control Section

As illustrated in FIG. 2, the voltage control section 15 is configured to include a gap detection section 151, a feedback control section 152, and a micro-controller 16.

The gap detection section 151 detects the dimension of a gap G1 from the electrostatic capacitance between reflective films 54 and 55 and outputs the detection signal to the feedback control section 152. Specifically, the gap detection section 151 includes a C-V conversion circuit (not shown) and converts the electrostatic capacitance between the reflective films 54 and 55 to a voltage value (a detection voltage). A switched capacitor circuit is an example of such a C-V conversion circuit.

Note that, as the detection signal, the gap detection section 151 may output an analog signal and may output a digital signal. When a digital signal is output, the detection signal (the analog signal) from the C-V conversion circuit is input to an analog to digital converter (ADC) and is converted into a digital value.

The feedback control section 152 is connected to a fixed electrode 561 and a movable electrode 562 of the variable wavelength interference filter 5. The feedback control section 152 applies a drive voltage to the electrostatic actuator 56 based on a command signal indicating that the gap G1 which is input from the micro-controller is to be set to a predetermined target value.

The feedback control section 152 controls the increasing and decreasing of the drive voltage in relation to the electrostatic actuator 56 such that the deviation between the detection signal from the gap detection section 151 and the command signal which is input from the micro-controller 16 is less than or equal to a predetermined threshold. In other words, the feedback control section 152 carries out feedback control based on the detection signal and the command signal.

The feedback control section 152 has a phase compensation function which compensates a phase change caused by the variable wavelength interference filter 5 which is the control target in order to cause the value of the gap dimension between the reflective films of the variable wavelength interference filter 5 to converge appropriately.

The micro-controller 16 is provided with a memory 161, and the relationship (gap correlation data) between the detection signal (the voltage signal) which is detected by the gap detection section 151, for example, and the dimension of the gap G1 is stored. As illustrated in FIG. 2, the micro-controller 16 functions as a target command unit 162.

When the wavelength setting command is input to the target command unit 162 from the control section 20, the target command unit 162 calculates the dimension (the target value) of the gap G1 corresponding to the target wavelength and outputs the dimension to the feedback control section 152 as the target signal.

Configuration of Feedback Loop

Figure 3:
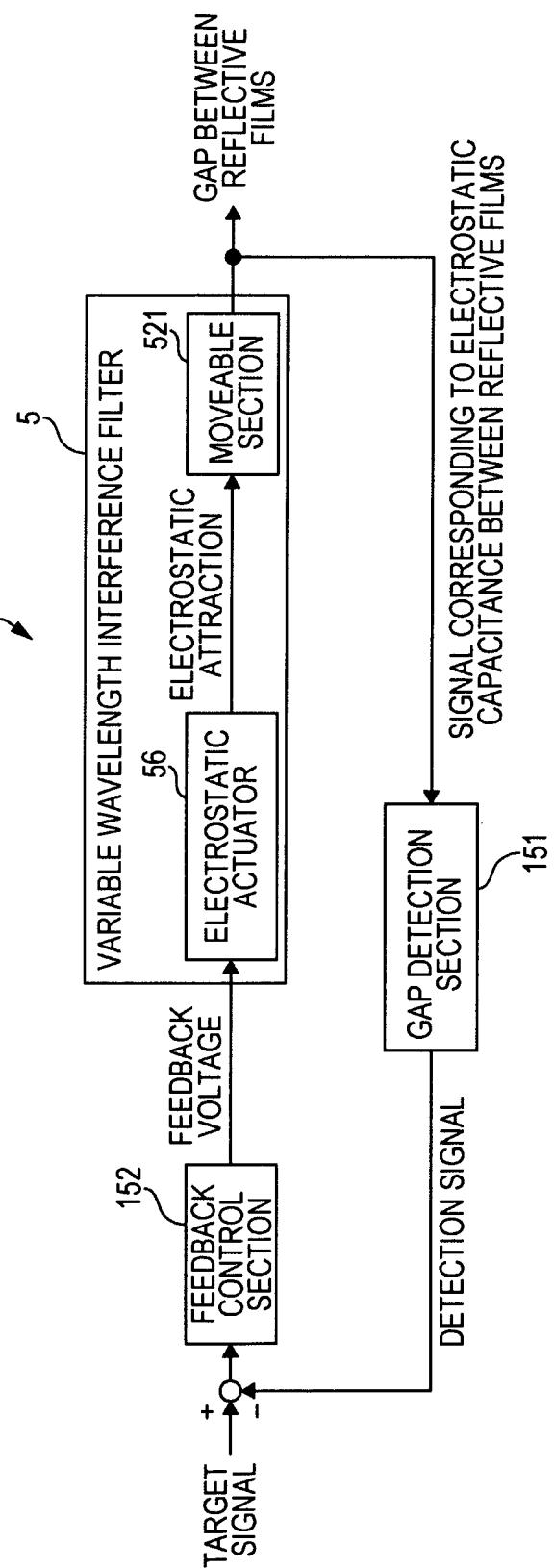
FIG. 3 is a conceptual diagram of a closed loop system.

FIG. 3 is a conceptual diagram of a closed loop system in which the variable wavelength interference filter 5 is set as the control target of feedback control.

As illustrated in FIG. 3, a closed loop system 15L (the feedback loop) is formed of the variable wavelength interference filter 5 (the electrostatic actuator 56 and a movable section 521) which is the control target, and the gap detection section 151 and the feedback control section 152 of the voltage control section 15. In the present embodiment, the closed loop system 15L carries out feedback control in which a feedback voltage corresponding to the driving characteristics of the variable wavelength interference filter 5 is applied to the variable wavelength interference filter 5 and the dimension of the gap G1 between the reflective films is set to a value corresponding to the target command from the micro-controller 16.

Here, the closed loop system 15L is configured such that the detection signal of the gap detection section 151 is inverted 180° and input to the feedback control section 152, and the value of the gap dimension between the reflective films of the variable wavelength interference filter 5 is caused to converge. Therefore, in the closed loop system 15L, when the phase difference between the input and the output is greater than or equal to 180°, the output of the closed loop system 15L diverges.

To address this, in the present embodiment, the sum of the phase compensation amount of the feedback control section 152 which has the phase compensation function as described above and the phase variation amount caused by the variable wavelength interference filter 5 is set so as not to become 180°.

In the present embodiment, for example, the phase compensation amount set by the feedback control section 152 is set to −90°, for example. In this case, a phase rotation angle (absolute value) $\theta_{chip}$ which indicates the phase delay caused by the chip resonance of the variable wavelength interference filter 5 is set to satisfy $0° \leq \theta_{chip} < 90°$. Accordingly, it is possible to set the phase rotation angle $\theta_{chip}$ in the voltage control section 15 to less than 360°, and it is possible to suppress the vibration. Note that, the specific configuration of the optical filter device 6 in order to suppress an increase in $\theta_{chip}$ and to keep within the range described above will be described in detail later.

Configuration of Optical Filter Device

Figure 4:
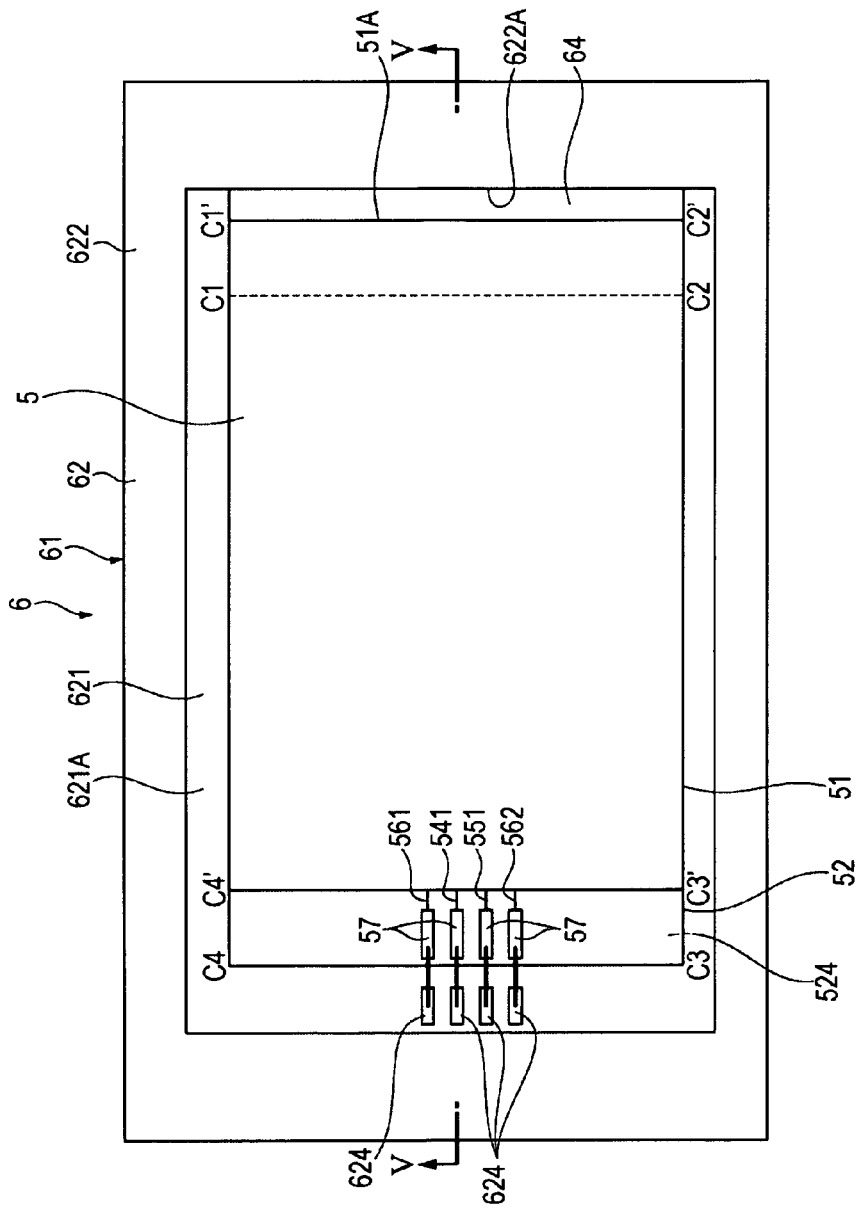
FIG. 4 is a plan view illustrating the schematic configuration of an optical filter device.
Figure 5:
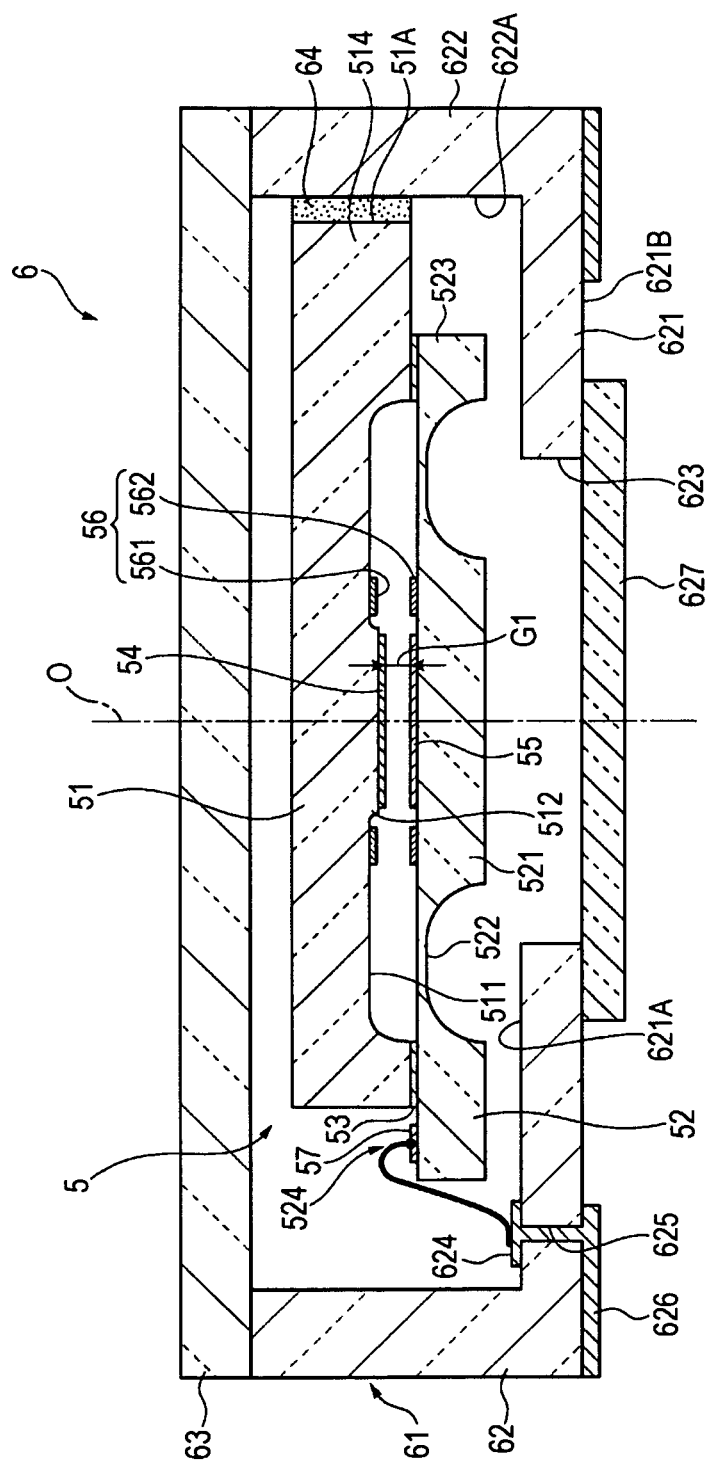
FIG. 5 is a sectional diagram illustrating the schematic configuration of the optical filter device.

FIG. 4 is a plan view illustrating the schematic configuration of the optical filter device in FIG. 2. FIG. 5 is an enlarged sectional diagram in which the optical filter device in FIG. 2 is enlarged. Specifically, FIG. 4 is a plan view of the inner portion of the optical filter device 6 in which the variable wavelength interference filter 5 is stored, as viewed from the substrate thickness direction (a normal line direction of the reflective films 54 and 55 described later), and FIG. 5 is a sectional diagram in which the optical filter device 6 is cut along the substrate thickness direction along line V-V illustrated in FIG. 4.

The optical filter device 6 is a device which extracts light of a predetermined intended wavelength from incident light and emits the extracted light, and, as illustrated in FIGS. 4 and 5, is provided with a housing 61, and the variable wavelength interference filter 5 which is stored in the inner portion of the housing 61.

Configuration of Variable Wavelength Interference Filter

As illustrated in FIGS. 4 and 5, the variable wavelength interference filter 5 is provided with a fixed substrate 51 which corresponds to a first substrate of the invention, and a movable substrate 52 which corresponds to a second substrate of the invention. The fixed substrate 51 and the movable substrate 52 are each formed of various types of glass, crystal, or the like, for example. As illustrated in FIG. 5, the fixed substrate 51 and the movable substrate 52 are configured integrally by being bonded with a bonding film 53.

The fixed substrate 51 is provided with a fixed reflective film 54 which corresponds to a first reflective film of the invention. The movable substrate 52 is provided with a movable reflective film 55 which corresponds to a second reflective film of the invention. The fixed reflective film 54 and the movable reflective film 55 are disposed to face each other via the gap G1.

The electrostatic actuator 56 which is used for adjusting the distance (the gap dimension) of the gap G1 is provided in the variable wavelength interference filter 5.

One end side of the fixed substrate 51 is provided with a protruding section 514 which protrudes further outside than a substrate edge of the movable substrate 52. An end side of the movable substrate 52 of the opposite side from the protruding section 514 of the fixed substrate 51 is provided with a protruding section which protrudes further outside than the substrate edge of the fixed substrate 51, and the surface of the fixed substrate 51 side of the protruding section forms a wiring section 524. Electrode pads 57 are provided on the wiring section 524, and electrodes (the fixed electrode 561 and the movable electrode 562) for applying a voltage to the electrostatic actuator 56 and electrodes (a fixed mirror electrode 541 and a movable mirror electrode 551) for detecting the electrical capacitance of each of the reflective films 54 and 55 are connected individually to each of the electrode pads 57. Each of the electrodes is connected to an inside terminal section 624 which is provided on a base 62 via the electrode pad 57.

In the present embodiment, a configuration is exemplified in which the gap G1 between the reflective films 54 and 55 is formed to be smaller than the gaps between the electrodes; however, for example, depending on the wavelength region of light to be allowed to pass through by the variable wavelength interference filter 5, the gap G1 may be formed to be larger than the gaps between the electrodes.

Note that, in the explanation given hereinafter, a plan view as viewed from the substrate thickness direction of the fixed substrate 51 or the movable substrate 52, that is, a plan view of the variable wavelength interference filter 5 as viewed from the lamination direction of the fixed substrate 51, the bonding film 53, and the movable substrate 52 will be referred to as a filter plan view. The center points of the reflective films 54 and 55 will be referred to the filter center points, and an axial line passing through the filter center points will be referred to as a filter center axis O.

Configuration of Fixed Substrate

As illustrated in FIG. 5, an electrode disposition groove 511 and a reflective film installation section 512 are formed in the fixed substrate 51 using etching. The fixed substrate 51 is formed to have a greater thickness dimension than the movable substrate 52 and has enough rigidity to ensure that flexure of the fixed substrate 51 caused by the electrostatic attraction which arises when a voltage is applied to the electrostatic actuator 56 and the internal stress of the fixed electrode 561 does not occur.

Here, by setting the thickness dimension of the fixed substrate 51 to be great, it is possible to increase the mass of the entirety of the variable wavelength interference filter 5. Accordingly, as described later, it is possible to suppress one-dimensional resonance vibration (chip vibration) of the variable wavelength interference filter 5, and it is possible to improve the stability of the feedback control.

The electrode disposition groove 511 is formed in an annular shape centered on the filter center axis O of the fixed substrate 51 in filter plan view. The reflective film installation section 512 is formed to protrude from the center portion of the electrode disposition groove 511 to the movable substrate 52 side. An electrode which forms the electrostatic actuator 56 is disposed on the groove bottom surface of the electrode disposition groove 511.

The fixed electrode 561 which forms the electrostatic actuator 56 is disposed on the groove bottom surface of the electrode disposition groove 511.

The fixed electrode 561 is formed in a substantially arc-shape to surround the reflective film installation section 512 in filter plan view. The fixed electrode 561 is wired to the wiring section 524 of the movable substrate 52 and, from the wiring section 524, is connected to the feedback control section 152 (described later) of the voltage control section 15.

The fixed reflective film 54 is disposed on the protruding end surface of the reflective film installation section 512. For example, it is possible to use a metal film such as Ag, a film of a conductive alloy such as an Ag alloy as the fixed reflective film 54. For example, a dielectric multi-layer film using $TiO_2$ as a high refraction layer and $SiO_2$ as a low refraction layer may be used, and, in this case, it is possible to cause the fixed reflective film 54 to function as an electrode due to a conductive metal alloy film being formed on the bottommost layer or the surface layer of the dielectric multi-layer film.

The fixed mirror electrode 541 is connected to the fixed reflective film 54. The fixed mirror electrode 541 is wired to the wiring section 524 of the movable substrate 52 and, from the wiring section 524, is connected to the gap detection section 151 (described later) of the voltage control section 15.

Configuration of Movable Substrate

As illustrated in FIG. 5, the movable substrate 52 is provided with the movable section 521, a holding section 522, and a substrate outer circumferential section 523. The movable section 521 is a circular shape centered on the filter center axis O, the holding section 522 is coaxial with the movable section 521 and holds the movable section 521, and the substrate outer circumferential section 523 is provided on the outside of the holding section 522.

The movable section 521 is formed to have a larger diameter dimension than the diameter dimension of the protruding end surface of at least the reflective film installation section 512 in filter plan view. The movable electrode 562 and the movable reflective film 55 are provided on the movable section 521.

The movable electrode 562 faces the fixed electrode 561 via a predetermined gap.

The movable electrode 562 is wired to the wiring section 524 of the movable substrate 52 and, from the wiring section 524, is connected to the feedback control section 152 (described later) of the voltage control section 15.

The movable reflective film 55 is provided on the center portion of the surface of the movable section 521 which faces the fixed substrate 51 via the gap G1 with the fixed reflective film 54. A reflective film of the same configuration as the fixed reflective film 54 which is described above is used as the movable reflective film 55.

A movable mirror electrode (not shown) is connected to the movable reflective film 55. The movable mirror electrode 551 is wired to the wiring section 524 of the movable substrate 52 and, from the wiring section 524, is connected to the gap detection section 151 (described later) of the voltage control section 15.

The holding section 522 is a diaphragm surrounding the periphery of the movable section 521 and is formed to have a smaller thickness dimension than the movable section 521. The holding section 522 flexes more easily than the movable section 521 and, due to a minute electrostatic attraction, it is possible to cause the movable section 521 to be displaced to the fixed substrate 51 side. At this time, since the thickness dimension and the rigidity of the movable section 521 are both greater than those of the holding section 522, even when the holding section 522 is pulled to the fixed substrate 51 side by the electrostatic attraction, the movable section 521 does not change shape. Therefore, flexure of the movable reflective film 55 which is provided on the movable section 521 also does not occur, and it is possible to always maintain the fixed reflective film 54 and the movable reflective film 55 in a parallel state.

Note that, in the present embodiment, although the holding section 522 with a diaphragm form is exemplified, the configuration is not limited thereto, and, for example, a configuration may be adopted in which beam-shaped holding sections which are disposed at an equal angle interval around the filter center axis O are provided.

The substrate outer circumferential section 523 is positioned on the outside of the holding section 522 in filter plan view, and supports the movable section 521 via the holding section 522.

Here, the ratio of the mass of the movable section 521 to the mass of the variable wavelength interference filter 5 excluding the movable section 521 which is supported on the substrate outer circumferential section 523 is set to be less than or equal to a threshold (a second threshold) at which a one-dimensional resonance frequency (a chip resonance frequency) fc of the chip vibration is half the value of the one-dimensional resonance frequency (a mirror resonance frequency) fm of the mirror vibration. Accordingly, it is possible to increase the difference between the chip resonance frequency fc and the mirror resonance frequency fm, and it is possible to suppress the resonance between the chip vibration and the mirror vibration.

Configuration of Housing

Description will be given of the detailed configuration of the housing 61 in the optical filter device 6.

As illustrated in FIGS. 4 and 5, the housing 61 is provided with the base 62 (the base section) and a lid 63. For example, for the base 62 and the lid 63, it is possible to use low melting point glass bonding using glass frit (low melting point glass) which is fragments of glass obtained by melting glass raw materials at high temperature and quenching the heated material, adhesion using an epoxy resin or the like, and therefore, a storage space is formed on the inner portion and the variable wavelength interference filter 5 is stored in this storage space.

Configuration of Base

The base 62 is formed by laminating ceramic on a thin plate, for example, and is provided with a seat section 621 and a side wall section 622.

The seat section 621 is formed in a flat plate shape having a rectangular outer shape, for example, in filter plan view, and the cylindrical side wall section 622 is erected from the outer circumferential portion of the seat section 621 toward the lid 63. Note that, in the present embodiment, since the seat section 621 is a rectangular flat plate shape, an example is given in which, corresponding to this shape, the side wall section 622 is formed in a quadrangular prism shape; however, the side wall section 622 may be formed in a cylindrical shape or the like, for example.

The seat section 621 is provided with a light transmitting hole 623 which penetrates the seat section 621 in the thickness direction. The light transmitting hole 623 is provided to contain a region overlapping the reflective films 54 and 55 in plan view of the seat section 621 as viewed from the thickness direction in a state in which the variable wavelength interference filter 5 is stored in the seat section 621.

A cover glass 627 which is a transparent member of the invention which covers the light transmitting hole 623 is bonded to the surface (a base outside surface 621B) of the opposite side of the seat section 621 from the lid 63.

It is possible to use low melting point glass bonding or bonding by adhesive, for example, for the bond between the seat section 621 and the cover glass 627. In the present embodiment, the inside of the storage space is maintained airtight in a state of being maintained under reduced pressure. Therefore, it is preferable that the seat section 621 and the cover glass 627 are bonded using the low melting point glass bonding.

The inside terminal sections 624 which are connected to the electrode pads 57 to which each of the electrodes (the fixed electrode 561, the movable electrode 562, and each of the mirror electrodes 541 and 551) is individually connected are provided on the inner surface (a base inside surface 621A) of the seat section 621 facing the lid 63. The inside terminal sections 624 and the electrode pads 57 are connected to each other using wires of Au or the like using wire bonding, for example. Note that, in the present embodiment, although wire bonding is exemplified, flexible printed circuits (FPC) or the like may be used, for example.

Conducting holes 625 are formed in the seat section 621 in the positions in which the inside terminal sections 624 are provided. The inside terminal sections 624 are connected, via the conducting holes 625, to outside terminal sections 626 which are provided on the base outside surface 621B of the seat section 621. The outside terminal sections 626 are electrically connected to the voltage control section 15.

The side wall section 622 is erected from the edge portion of the seat section 621 and covers the periphery of the variable wavelength interference filter 5 which is mounted on the base inside surface 621A. The surface of the side wall section 622 facing the lid 63 is a flat surface which is parallel to the base inside surface 621A, for example.

Fixing Structure of Variable Wavelength Interference Filter

As illustrated in FIGS. 4 and 5, the variable wavelength interference filter 5 is fixed to the base 62 using a fixing material 64 by a surface 51A (a side surface 51A) along the substrate thickness direction of the fixed substrate 51.

As illustrated in FIG. 4, the fixing material 64 is provided between the side surface 51A of the fixed substrate 51 and the base 62. The fixing material 64 is formed using an epoxy-based or silicone-based adhesive, for example.

Here, as described later, by setting the elastic modulus of the fixing material 64 to less than or equal to a predetermined value (a first threshold), it is possible to set the chip resonance frequency fc to less than or equal to a predetermined value, it is possible to suppress the resonance between the chip vibration and the mirror vibration, and it is possible to reduce the amplitude of the mirror vibration. Note that, the first threshold is an upper limit value of the elastic modulus at which the fixing material 64 is capable of elastic deformation corresponding to the chip vibration.

The rigidity of the fixing material 64 is smaller than the rigidity of the holding section 522, and the rigidity of the holding section 522 is smaller than the rigidity of the substrates 51 and 52. In this case, when stress caused by a disturbance or the like acts on the variable wavelength interference filter 5, it is possible to attenuate the chip vibration by allowing the fixing material 64 to elastically deform. By allowing the fixing material 64 to elastically deform, it is possible to suppress the deformation of the holding section 522 and it is possible to suppress the occurrence of the mirror vibration being excited according to the chip vibration.

Here, when a mass $M_{chip}$ [kg] of the variable wavelength interference filter 5 is X times a mass $M_{mirror}$ [kg] of the moveable section 521, a spring constant $K_{bond}$ [N/m] as the rigidity of the fixing material 64 is smaller than a value obtained by multiplying a spring constant $K_{diaphragm}$ [N/m] as the rigidity of the holding section 522 by X/4. Accordingly, as explained using expressions (1) to (8) below, it is possible to set the chip resonance frequency fc to less than or equal to half the value of the mirror resonance frequency fm.

Hereinafter, description will be given of the reason it is possible to set the chip resonance frequency fc to less than or equal to half the value of the mirror resonance frequency fm. Note that, in the following description, each of the chip vibration and the mirror vibration will be approximated with a one degree of freedom vibration model for simplicity.

In the one degree of freedom vibration model, a chip vibration natural angular frequency $\omega_{chip}$ [rad/s] is obtained in expression (1), and a mirror vibration natural angular frequency $\omega_{mirror}$ [rad/s] is obtained in expression (2).

$$\omega_{chip} = \sqrt{\frac{K_{bond}}{M_{chip}}} \quad (1)$$

$$\omega_{mirror} = \sqrt{\frac{K_{diaphragm}}{M_{mirror}}} \quad (2)$$

Here, when the chip resonance frequency fc is set to be less than or equal to half the value of the mirror resonance frequency fm, as in expression (3), the chip vibration natural angular frequency $\omega_{chip}$ also becomes less than or equal to half the value of the mirror vibration natural angular frequency $\omega_{mirror}$.

$$\omega_{chip} < \frac{1}{2}\omega_{mirror} \quad (3)$$

Therefore, the conditions for setting the chip resonance frequency fc to less than or equal to half the value of the mirror resonance frequency fm are obtained by obtaining the relationship to be satisfied by the spring constant $K_{bond}$ of the fixing material 64 and the spring constant $K_{diaphragm}$ of the holding section 522 in order to satisfy expression (3).

First, expressions (1) and (2) are substituted into expression (3), the chip vibration natural angular frequency $\omega_{chip}$ and the mirror vibration natural angular frequency $\omega_{mirror}$ are removed, and expression (4) is obtained. Both sides of expression (4) are squared to obtain expression (5). Expression (5) illustrates the relationship between the mass $M_{chip}$ of the variable wavelength interference filter 5, the mass $M_{mirror}$ of the movable section 521, the spring constant $K_{bond}$ of the fixing material 64, and the spring constant $K_{diaphragm}$ of the holding section 522.

$$\sqrt{\frac{K_{bond}}{M_{chip}}} < \frac{1}{2}\sqrt{\frac{K_{diaphragm}}{M_{mirror}}} \quad (4)$$

$$\frac{K_{bond}}{M_{chip}} < \frac{1}{4}\frac{K_{diaphragm}}{M_{mirror}} \quad (5)$$

As illustrated in expression (6), the mass $M_{chip}$ of the variable wavelength interference filter 5 is X times the mass $M_{mirror}$ of the movable section 521, that is, the ratio of $M_{chip}$ to $M_{mirror}$ is X. The relationship of expression (6) is applied to expression (5), and expression (7) is obtained. Both sides of expression (7) are arranged to obtain expression (8). In this manner, as illustrated in expression (8), by setting the spring constant $K_{bond}$ of the fixing material 64 to be smaller than X/4 times the spring constant $K_{diaphragm}$ of the holding section 522, it is possible to set the chip resonance frequency fc to less than or equal to half the value of the mirror resonance frequency fm.

$$M_{chip} = X \cdot M_{mirror} \quad (6)$$

$$\frac{K_{bond}}{X \cdot M_{mirror}} < \frac{1}{4}\frac{K_{diaphragm}}{M_{mirror}} \quad (7)$$

$$K_{bond} < \frac{X}{4}K_{diaphragm} \quad (8)$$

Configuration of Lid

The lid 63 is a flat glass plate and is bonded to the end surface of the side wall section 622 of the base 62. As described above, it is possible to use low melting point glass bonding or the like as the bonding method of the lid 63 and the base 62.

Vibration of Variable Wavelength Interference Filter

Hereinafter, description will be given of the vibration which occurs when at least one location of one side of the variable wavelength interference filter 5 is fixed using the fixing material 64. As described above, in the variable wavelength interference filter 5 which is fixed via one location of a vertex C4 side, for example, as the one side of the variable wavelength interference filter 5, there is a case in which vibration occurs with the vertex C4 as a fixed end due to disturbance vibration which is applied to the optical filter device 6 or vibration of the movable section 521 caused by the application of the drive voltage to the electrostatic actuator 56. For example, there is a case in which chip vibration which is one-dimensional resonance vibration in the substrate thickness direction with a vertex C2', which is the opposite corner from the vertex C4, is a free end occurs as the vibration with the vertex C4 as the fixed end. In this chip vibration, the amplitude increases from the vertex C4 which is the fixed end toward the vertex C2' side.

Here, when the chip resonance frequency fc which is the one-dimensional resonance frequency of the chip vibration and the mirror resonance frequency fm which is the one-dimensional resonance frequency of the movable section 521 are close, there is a case in which, when chip vibration occurs in the variable wavelength interference filter 5 as described above, the movable section 521 resonates corresponding to the chip vibration, and the mirror vibration which is the one-dimensional resonance vibration of the movable section 521 occurs. When such vibration occurs, the vibration amplitude of the movable section 521 and the amplitude of the chip vibration increase.

There is a concern that, in the closed loop system 15L, the phase rotation angle $\theta_{chip}$ caused by the chip resonance which is the maximum value of the variation amount of the phase (the phase delay amount) caused by the variable wavelength interference filter 5 will increase and the stability of the feedback control will be reduced.

To address this, in the present embodiment, a configuration is adopted in which the phase rotation angle $\theta_{chip}$ caused by the chip resonance is caused to approach 0°, and therefore, the stability of the feedback control is improved. Specifically, in the present embodiment, in order to reduce the phase rotation angle $\theta_{chip}$ caused by the chip resonance by suppressing the resonance of the movable section 521, the following configurations are adopted.

(1) Reduction in mass of the movable section 521
(2) Rigidity increasing of the holding section 522
(3) Increase in mass of the variable wavelength interference filter 5
(4) Reduction in elasticity of the fixing material 64

In the present embodiment, according to the configurations (1) to (4), the chip resonance frequency fc is reduced, the chip resonance frequency fc is set to less than or equal to the mirror resonance frequency fm. Accordingly, it is possible to suppress the resonance between the chip vibration and the mirror vibration in the variable wavelength interference filter 5. Note that, it is more favorable to set the chip resonance frequency fc to less than or equal to 1/10 of the mirror resonance frequency fm, and it is possible to more reliably suppress the resonance between the chip vibration and the mirror vibration.

In this manner, by increasing the difference between the chip resonance frequency fc and the mirror resonance frequency fm and suppressing the resonance between the chip vibration and the mirror vibration, it is possible to cause the phase rotation angle $\theta_{chip}$ caused by the chip resonance to approach 0°, and it is possible to improve the stability of the feedback control.

By suppressing the resonance between the chip vibration and the mirror vibration, it is possible to set the phase rotation angle $\theta_{chip}$ caused by the chip resonance to a range of $0° \leq \theta_{chip} < 90°$. Therefore, since the sum of the phase compensation amount (the absolute value) of the feedback control section 152 and the phase rotation angle $\theta_{chip}$ caused by the chip resonance of the variable wavelength interference filter 5 does not become 180°, it is possible to cause the dimension of the gap G1 between the reflective films to converge in the feedback control carried out by the closed loop system 15L.

Analysis in Two Degrees of Freedom Vibration Model

Hereinafter, description will be given of the fact that it is possible to improve the stability of the feedback control by performing analysis using the two degrees of freedom vibration model and decreasing the phase rotation angle $\theta_{chip}$ caused by the chip resonance using the configurations (1) to (4).

Figure 6:
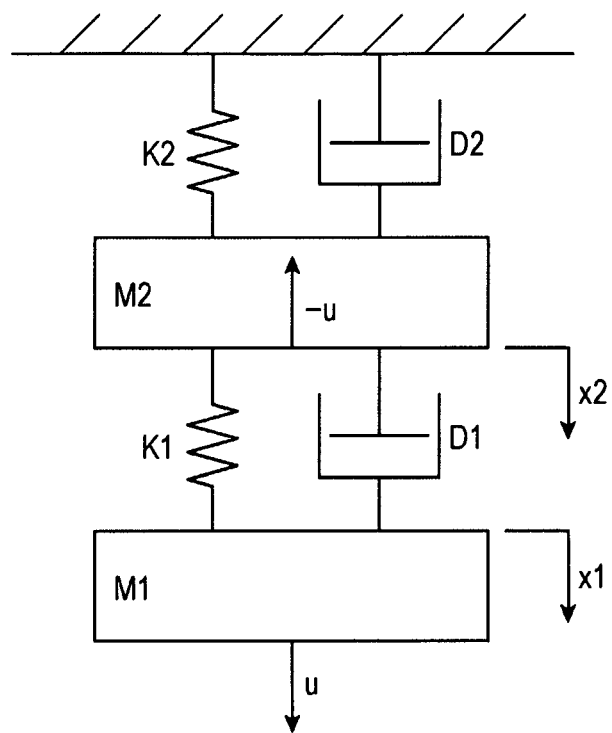
FIG. 6 is a diagram illustrating a two degrees of freedom vibration model.

FIG. 6 is a diagram illustrating a simplified equivalent model of the optical filter device 6 in which the optical filter device 6 is modeled as a two degrees of freedom vibration model.

In FIG. 6, M1 is the mass of the movable section 521 including the movable reflective film 55, x1 is the displacement of the movable section 521 (that is, the movable reflective film 55), K1 is the spring constant of the holding section 522 and corresponds to $K_{diaphragm}$ described above. M2 is the mass of the variable wavelength interference filter 5 excluding the movable section 521 and the movable reflective film 55, and x2 is the displacement of the variable wavelength interference filter 5. K2 is the spring constant of the entirety of the variable wavelength interference filter 5 which is fixed to the base 62 by the fixing material 64. Note that, the spring constant K2 also includes the elasticity of the fixing material 64. Additionally, u is the force which is applied by the electrostatic actuator 56.

Variation in Parameters and Frequency Characteristics

The parametric analysis was carried out using the simplified equivalent model illustrated in FIG. 6, and the variation in the frequency characteristics in relation to each of the parameters M1, K1, M2, and K2 of the variable wavelength interference filter 5 was analyzed. Hereinafter, description will be given of the results of the parametric analysis in each of the parameters M1, K1, M2, and K2.

Note that, in the parametric analysis, the values illustrated in Table below were used as the analysis conditions (the fixed values of the parameters).

TABLE

| Parametric Analysis Conditions | |
|---|---|
| M1 (kg) | 1E−6, 5E−6, 1E−5, 2E−5, 3E−5, 4E−5, 5E−5, 1E−4 |
| K1 (N/m) | 1E+4, 3.7E+4, 1.37E+5, 2.37E+5, 3.37E+5, 4.37E+5 |
| M2 (kg) | 5E−5, 1E−4, 2E−4, 5E−4, 1E−3 |
| K2 (N/m) | 1E+4, 2E+4, 5E+4, 1E+5, 2E+5, 5E+5, 1E+6, 1E+7 |

Analysis Results of M1

FIGS. 7A and 7B are graphs illustrating the results of carrying out the parametric analysis on the mass M1 of the movable section 521 including the movable reflective film 55 using the values of Table. FIG. 7A illustrates the frequency characteristics (the gain characteristics) of the amplitude of the variable wavelength interference filter 5, and FIG. 7B illustrates the frequency characteristics of the phase (the phase characteristics).

Here, in the gain characteristics illustrated in FIG. 7A, the values of each M1 include peaks in two locations, one on the low frequency side and one on the high frequency side. Of these peaks, the peaks of the low frequency side correspond to the chip vibration (the chip resonance frequency fc), and the peaks of the high frequency side correspond to the mirror vibration (the mirror resonance frequency fm). The closer the chip resonance frequency fc and the mirror resonance frequency fm, the easier resonance occurs between the chip vibration and the mirror vibration, as described above. Note that, in the same manner, the other parameters than M1 also include peaks which correspond to each of the chip vibration and the mirror vibration.

As illustrated in FIG. 7A, a tendency for the amplitude of the chip vibration to decrease the more that M1 decreases is exhibited. This is considered to be because, the smaller M1 becomes, the mirror resonance frequency fm shifts to the high frequency side more than the chip resonance frequency fc and separates from the chip resonance frequency fc, therefore the occurrence of the mirror vibration corresponding to the chip vibration is suppressed and the chip vibration weakens.

Figure 8:
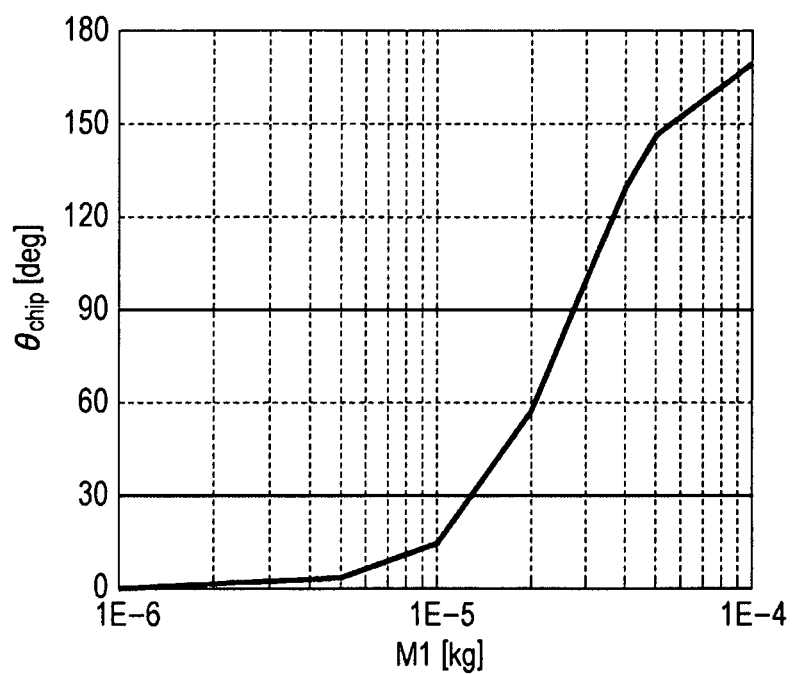
FIG. 8 is a graph illustrating the relationship between M1 and a maximum phase rotation angle.

FIG. 8 is a graph illustrating the variation in the absolute value of the phase rotation angle $\theta_{chip}$ caused by the chip resonance in relation to M1.

As illustrated in FIGS. 7B and 8, a tendency for the absolute value of the phase rotation angle $\theta_{chip}$ caused by the chip resonance which is the peak of the phase fluctuation in the chip resonance to be reduced more the smaller M1 becomes.

As an example of the configuration (1), reducing the thickness dimension of the movable substrate 52 is exemplified. Accordingly, it is possible to reduce the volume of the movable section 521 by reducing the thickness of the movable section 521, and it is possible to reduce M1 to a degree which is sufficient to set the phase rotation angle $\theta_{chip}$ caused by the chip resonance to less than or equal to the maximum permissible value. Note that, the mass M1 may be reduced by reducing the sectional surface area of the movable section 521 in a planar direction orthogonally intersecting the substrate thickness direction.

Here, as illustrated in FIG. 8, by setting M1 to less than or equal to 2E-5 (kg), it is possible to set the absolute value of the phase rotation angle $\theta_{chip}$ caused by the chip resonance to less than or equal to 90°, it is possible to suppress the phase delay in the feedback control, and it is possible to more reliably improve the stability of the closed loop system 15L. By setting M1 to less than or equal to 1E-5 (kg), it is possible to set the absolute value of the phase rotation angle $\theta_{chip}$ caused by the chip resonance to less than or equal to 30°, and it is possible to still more reliably improve the stability of the closed loop system 15L.

Analysis Results of K1

FIGS. 9A and 9B are graphs illustrating the results of carrying out the parametric analysis on the spring constant K1 of the holding section 522 in the same manner as in FIGS. 7A and 7B.

As illustrated in FIG. 9A, the greater K1 is, the greater the chip resonance frequency becomes, and the smaller the amplitude becomes. This is considered to be because, in the same manner as in the case of M1, the greater K1 becomes, the mirror resonance frequency fm separates from the chip resonance frequency fc, therefore the occurrence (resonance) of the mirror vibration corresponding to the chip vibration is suppressed.

Figure 10:
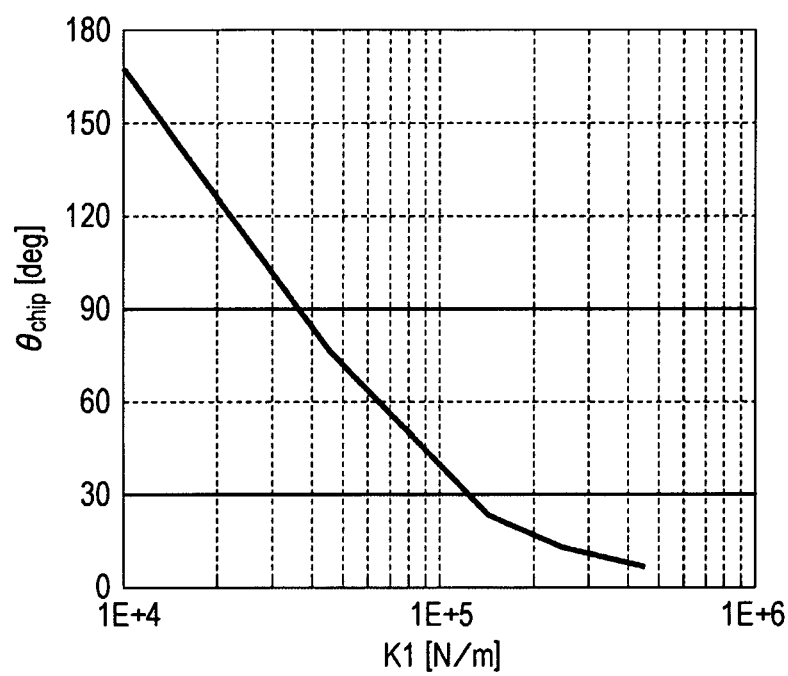
FIG. 10 is a graph illustrating the relationship between K1 and the maximum phase rotation angle.

FIG. 10 is a graph illustrating the variation in the absolute value of the phase rotation angle $\theta_{chip}$ caused by the chip resonance in relation to K1.

As illustrated in FIGS. 9B and 10, the greater K1 becomes, the smaller the absolute value of the phase rotation angle $\theta_{chip}$ caused by the chip resonance becomes.

In the present embodiment, as an example of the configuration (2), the thickness dimension of the holding section 522 is increased, and the rigidity of the holding section 522 is increased within a range in which the holding section 522 can elastically deform by the electrostatic attraction of the electrostatic actuator 56. Accordingly, it is possible to increase the spring constant K1. Note that, K1 may be increased by increasing the rigidity of the holding section 522 using a higher rigidity material for the movable substrate 52.

Here, as illustrated in FIG. 10, by setting K1 to greater than or equal to 4E+4 (N/m), it is possible to set the absolute value of the phase rotation angle $\theta_{chip}$ caused by the chip resonance to less than or equal to 90°. By setting K1 to less than or equal to 2E+5 (N/m), it is possible to set the absolute value of the phase rotation angle $\theta_{chip}$ caused by the chip resonance to less than or equal to 30°.

Analysis Results of M2

FIGS. 11A and 11B are graphs illustrating the results of carrying out the parametric analysis on the mass M2 of the variable wavelength interference filter 5 (however, this excludes the movable section 521 and the movable reflective film 55) in the same manner as in FIGS. 7A and 7B.

As illustrated in FIG. 11A, a tendency in which the greater M2 is, the greater the chip resonance frequency becomes, and the smaller the amplitude becomes is exhibited. This is considered to be because the greater M2 becomes, the more the occurrence of the chip vibration is suppressed.

Note that, as illustrated in FIG. 11A, the greater M2 is, the more the chip resonance frequency fc shifts to the low frequency side, and the shift amount is greater than the mirror resonance frequency fm. In other words, since the greater M2 becomes, the further the chip resonance fc separates from the mirror resonance frequency fm, the occurrence of the mirror vibration corresponding to the chip vibration is suppressed.

Figure 12:
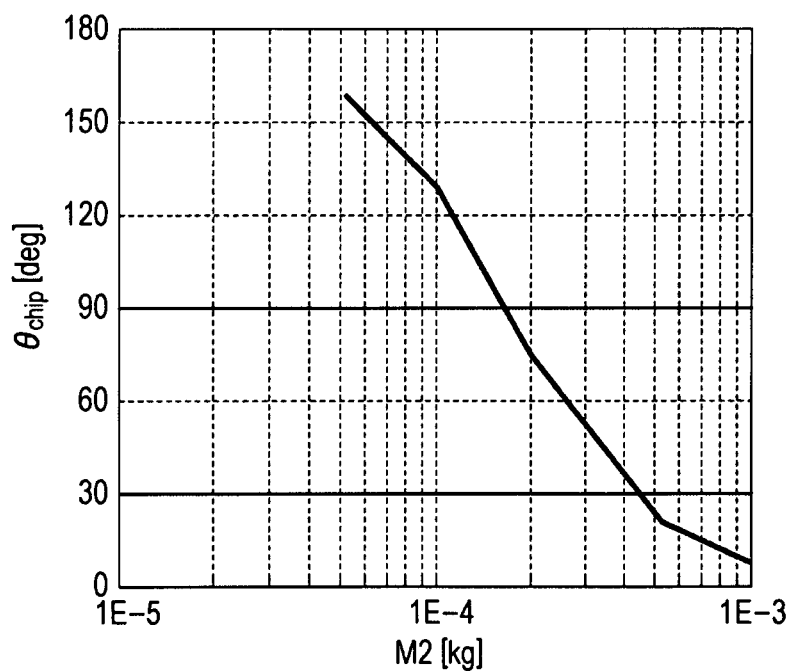
FIG. 12 is a graph illustrating the relationship between M2 and the maximum phase rotation angle.

FIG. 12 is a graph illustrating the variation in the phase rotation angle $\theta_{chip}$ caused by the chip resonance in relation to M2.

As illustrated in FIGS. 11B and 12, the greater M2 becomes, the smaller the phase rotation angle $\theta_{chip}$ caused by the chip resonance becomes.

In the present embodiment, as an example of the configuration (3), increasing the thickness dimension of the fixed substrate 51 is exemplified. Increasing the surface area of the fixed substrate 51 and the movable substrate 52 in filter plan view is exemplified. Accordingly, it is possible to increase M2.

Here, as illustrated in FIG. 12, by setting M2 to greater than or equal to 2E-4 (kg), it is possible to set the phase rotation angle $\theta_{chip}$ caused by the chip resonance to less than or equal to 90°. By setting M2 to greater than or equal to 5E-4 (kg), it is possible to set the phase rotation angle $\theta_{chip}$ caused by the chip resonance to less than or equal to 30°.

Note that, M2 may be increased by increasing the dimension of the fixed substrate 51 and the movable substrate 52 in plan view, for example, the distance dimension between the side C3-C4 and the side C1'-C2' in filter plan view while maintaining the size of the movable section 521.

In this case, it is possible to increase the length of the amplitude component in the chip vibration, that is, the distance from the vertex C4 to the vertex C2', and it is possible to reduce the chip resonance frequency. Accordingly, it is possible to more reliably suppress the occurrence of the mirror vibration corresponding to the chip vibration.

Analysis Results of K2

Figure 13A:
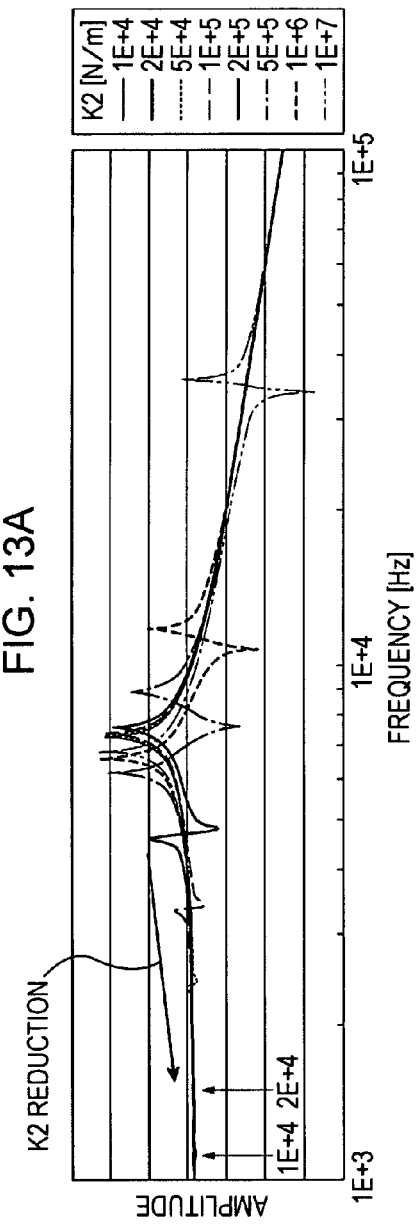
FIGS. 13A and 13B are graphs illustrating frequency characteristics relating to K2 when parametric analysis is carried out.
Figure 13B:
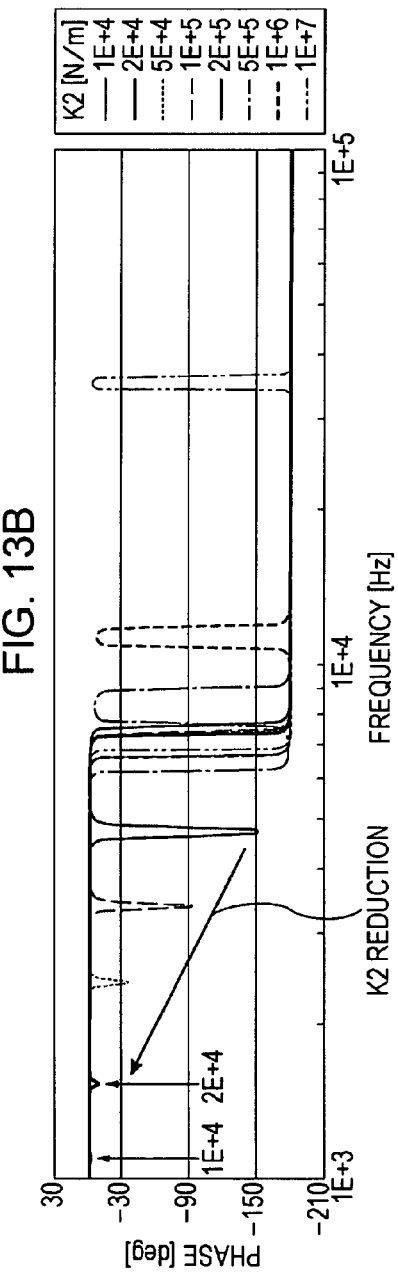

FIGS. 13A and 13B are graphs illustrating the results of carrying out the parametric analysis on the spring constant K2 of the entirety of the fixing material 64 and the variable wavelength interference filter 5 in the same manner as in FIGS. 7A and 7B.

As illustrated in FIG. 13A, the smaller K2 is, the smaller the chip resonance frequency fc becomes, and the smaller the amplitude becomes. This is considered to be because the smaller K2 becomes, the more the attenuation of the vibration caused by elastic deformation increases and the more the occurrence of the chip vibration is suppressed.

Note that, as illustrated in FIG. 13A, since the smaller K2 becomes, the greater the interval between the chip resonance frequency fc and the mirror resonance frequency fm becomes, the occurrence of the mirror vibration corresponding to the chip vibration is suppressed.

Figure 14:
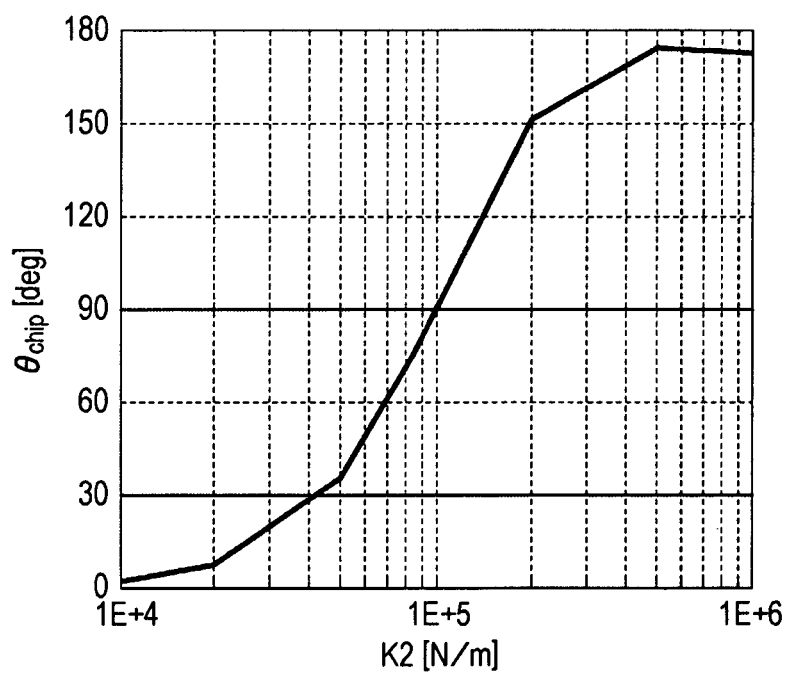
FIG. 14 is a graph illustrating the relationship between K2 and the maximum phase rotation angle.

FIG. 14 is a graph illustrating the variation in the phase rotation angle $\theta_{chip}$ caused by the chip resonance in relation to K2.

As illustrated in FIGS. 13B and 14, the smaller K2 becomes, the smaller the phase rotation angle $\theta_{chip}$ caused by the chip resonance becomes.

In the present embodiment, as the configuration (4), it is possible to exemplify a configuration in which the fixing material 64 which has an elastic modulus of a degree at which the fixing material 64 elastically deforms according to the vibration of the variable wavelength interference filter 5 is used. In other words, the fixing material 64 receives stress from the variable wavelength interference filter 5 which is apt to rotate around the fixing position of the fixing material 64, and the fixing material 64 has an elastic modulus at which it is possible to elastically deform (for example, less than or equal to 100 MPa). In this manner, due to the fixing material 64 elastically deforming, it is possible to reduce the chip resonance frequency fc and the amplitude, and it is possible to reduce the phase rotation angle $\theta_{chip}$ caused by the chip resonance.

Here, as illustrated in FIG. 14, by setting K2 to less than or equal to 1E+5 (N/m), it is possible to set the phase rotation angle $\theta_{chip}$ caused by the chip resonance to less than or equal to 90°. By setting K2 to less than or equal to 4E+4 (N/m), it is possible to set the phase rotation angle $\theta_{chip}$ caused by the chip resonance to less than or equal to 30°.

Operations and Effects of Embodiment

In the optical module 10 in the spectroscopy device 1 of the present embodiment, the chip resonance frequency fc which is the one-dimensional resonance frequency of the chip vibration is set to less than or equal to half the value of the mirror resonance frequency fm which is the one-dimensional resonance frequency of the movable section 521. Accordingly, even when the chip vibration is excited by a disturbance or the like, it is possible to suppress the occurrence of the mirror vibration of the movable section 521 being excited (resonance) by the chip vibration, and it is possible to suppress the fluctuation in the dimension of the gap G1 between the reflective films. Therefore, it is possible to suppress a reduction in the resolution of the variable wavelength interference filter 5 caused by the fluctuation of the gap dimension.

By setting the chip resonance frequency fc to less than or equal to 1/10 of the mirror resonance frequency fm, it is possible to more reliably suppress the mirror vibration and it is possible to reduce the resolution.

In the present embodiment, the elastic modulus of the fixing material 64 is set to less than or equal to a predetermined value (a first threshold) at which the fixing material 64 elastically deforms according to the stress corresponding to the rotation of the interference filter caused by the chip vibration. Here, the first threshold is an upper limit value of the elastic modulus at which the fixing material 64 is capable of elastic deformation corresponding to the chip vibration.

In this case, the value of the spring constant K2 of the entirety of the variable wavelength interference filter 5 decreases. Accordingly, it is possible to reduce the chip resonance frequency fc, and, it is possible to suppress the chip vibration using the elastic deformation of the fixing material 64. Therefore, it is possible to suppress the occurrence of the mirror vibration being excited by the chip vibration.

In the present embodiment, by reducing the mass M1 of the movable section 521 in relation to the mass M2 of the variable wavelength interference filter 5 excluding the movable section 521 to set the ratio of the mass M1 of the movable section 521 to the mass M2 to less than or equal to the second threshold at which the chip resonance frequency fc is set to half the value of the mirror resonance frequency fm, it is possible to increase the difference between the chip resonance frequency fc and the mirror resonance frequency fm, and it is possible to suppress the occurrence of the mirror vibration being excited by the chip vibration.

In the present embodiment, by reducing the mass M1 of the movable section 521, it is possible to increase the difference between the chip resonance frequency fc and the mirror resonance frequency fm, and it is possible to suppress the occurrence of the mirror vibration being excited by the chip vibration. It is possible to reduce M1 to a degree which is sufficient to set the phase rotation angle $\theta_{chip}$ caused by the chip resonance to less than or equal to the maximum permissible value.

In the present embodiment, by increasing the mass M2 of the variable wavelength interference filter 5 excluding the movable section 521, it is possible to increase the difference between the chip resonance frequency fc and the mirror resonance frequency fm, and it is possible to suppress the occurrence of the mirror vibration being excited by the chip vibration.

In the present embodiment, by setting the rigidity of the holding section 522 to be less than the rigidity of the substrates 51 and 52 and greater than the rigidity of the fixing material 64, it is possible to increase the difference between the chip resonance frequency fc and the mirror resonance frequency fm.

More specifically, in the present embodiment, the spring constant $K_{bond}$ which is the rigidity of the fixing material 64 is a value which is smaller than a value obtained by multiplying the spring constant $K_{diaphragm}$ which is the rigidity of the holding section 522 by X/4. In this case, as described above, it is possible to set the chip resonance frequency fc to less than or equal to half the value of the mirror resonance frequency fm, and it is possible to suppress the occurrence of the mirror vibration being excited by the chip vibration. For example, even if the chip vibration occurs due to a disturbance or the like, it is possible to suppress the excitation of the mirror vibration due to the fixing material 64 elastically deforming corresponding to the chip vibration. It is possible to suppress the resonance between the chip vibration and the mirror vibration.

Note that, by increasing the rigidity of the holding section 522, it is possible to increase the spring constant K1 of the holding section 522 and it is possible to increase the mirror resonance frequency fm.

The optical module 10 of the present embodiment is provided with the optical filter device 6 which is described above. Therefore, it is possible to suppress a reduction in the resolution of the variable wavelength interference filter 5 in the optical filter device 6, and it is possible to cause light to be emitted from the optical filter device in a state in which the resolution is maintained. Therefore, it is possible to detect the light quantity of the light of a desired wavelength at a high resolution using the detector 11 in the optical module 10.

The spectroscopy device 1 of the present embodiment can, in the same manner, carry out a high precision process based on the high resolution light which is output from the optical filter device 6.

In the present embodiment, the variable wavelength interference filter 5 configures the closed loop system 15L in addition to the gap detection section 151 and the feedback control section 152. Here, in the variable wavelength interference filter 5, since the chip resonance frequency fc is set to less than or equal to half the value of the mirror resonance frequency fm, it is possible to set the phase rotation angle $\theta_{chip}$ caused by the chip resonance which is the maximum value of the phase variation amount caused by the variable wavelength interference filter 5 in the closed loop system 15L to less than 90°. Accordingly, the phase delay in the variable wavelength interference filter 5 and the feedback control section 152 in the closed loop system 15L becomes less than 180° and it is possible to suppress vibration.

Other Embodiments

Note that, the invention is not limited by the embodiment described above and includes various modifications, improvements and the like carried out within a scope in which an advantage of the invention can be achieved.

For example, in the embodiment described above, a configuration is exemplified in which the side surface 51A of the fixed substrate 51 of the variable wavelength interference filter 5 is fixed by the fixing material 64; however, the invention is not limited to this configuration. In other words, in at least one of the fixed substrate 51 and the movable substrate 52, at least one location of the side surface along the substrate thickness direction, that is, one side of the variable wavelength interference filter 5 may be fixed using the fixing material 64.

First Modification Example of Optical Filter Device

Figure 15:
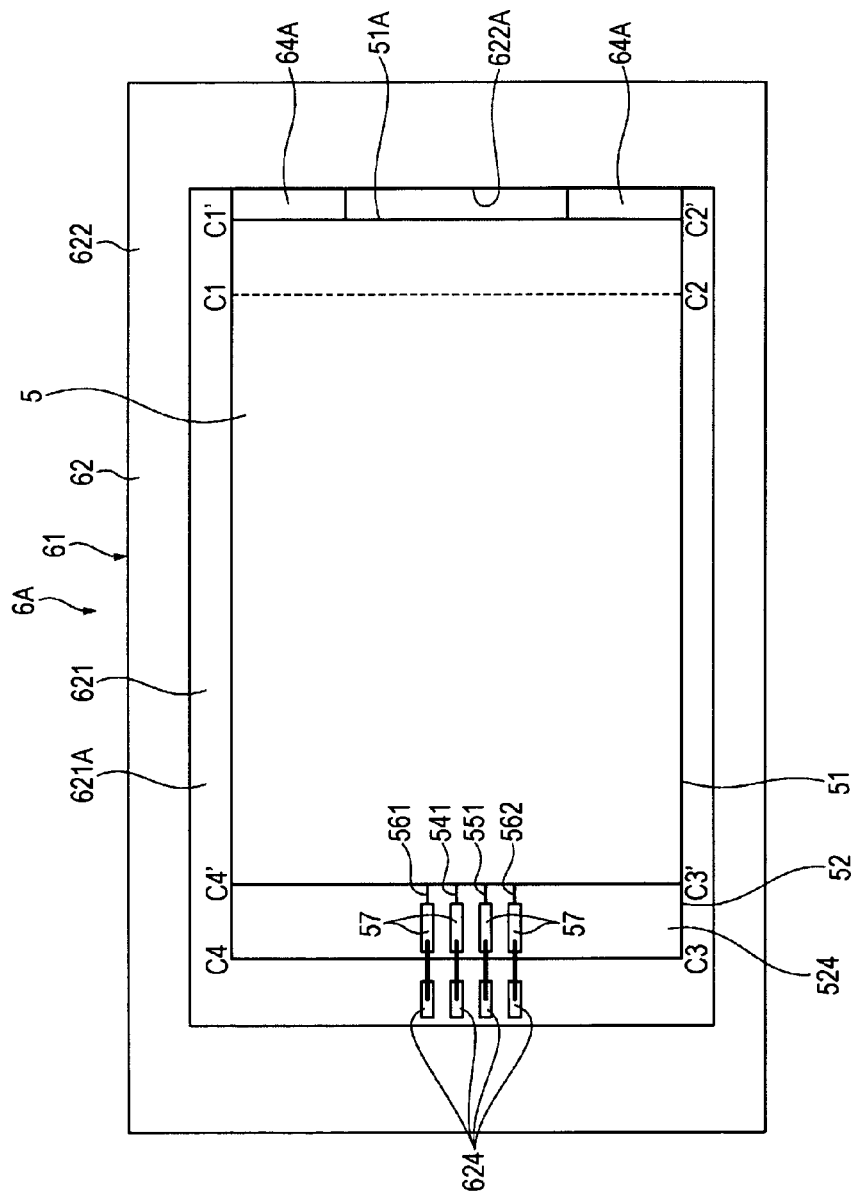
FIG. 15 is a plan view illustrating the schematic configuration of an optical filter device of a first modification example of the invention.

FIG. 15 is a plan view illustrating the schematic configuration of an optical filter device according to the first modification example.

In an optical filter device 6A according to the first modification example illustrated in FIG. 15, a fixing material 64A is provided in two locations of the side surface 51A of the fixed substrate 51. In this case, for example, in comparison to a case in which the variable wavelength interference filter 5 is fixed via one location of the corner portion of the fixed substrate 51 or the movable substrate 52, it is possible to suppress the rotation (torsion) of the fixed substrate 51 or the movable substrate 52 centered on the fixing location. It is possible to reduce the fixing surface area of the fixing material 64A, and it is possible to reduce the stress from the fixing material 64A which acts on the fixed substrate 51 or the movable substrate 52.

A plurality of locations of the side surface 51A of the fixed substrate 51 may be fixed, and a plurality of locations of the side surface of the movable substrate 52 may be fixed. The side surface of the fixed substrate 51 and the side surface of the movable substrate 52 may be fixed at the same time.

Second Modification Example of Optical Filter Device

Figure 16:
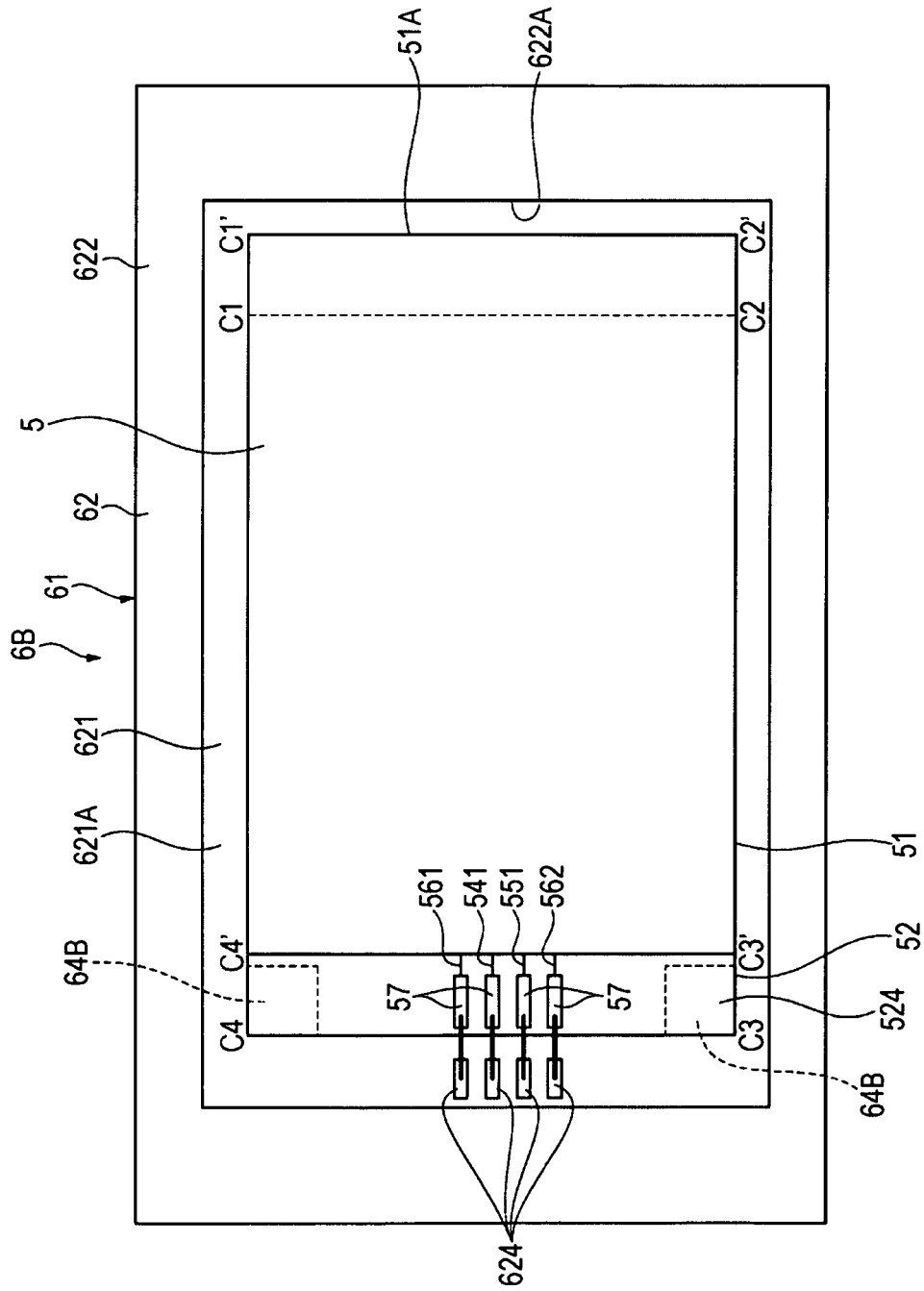
FIG. 16 is a plan view illustrating the schematic configuration of an optical filter device of a second modification example of the invention.
Figure 17:
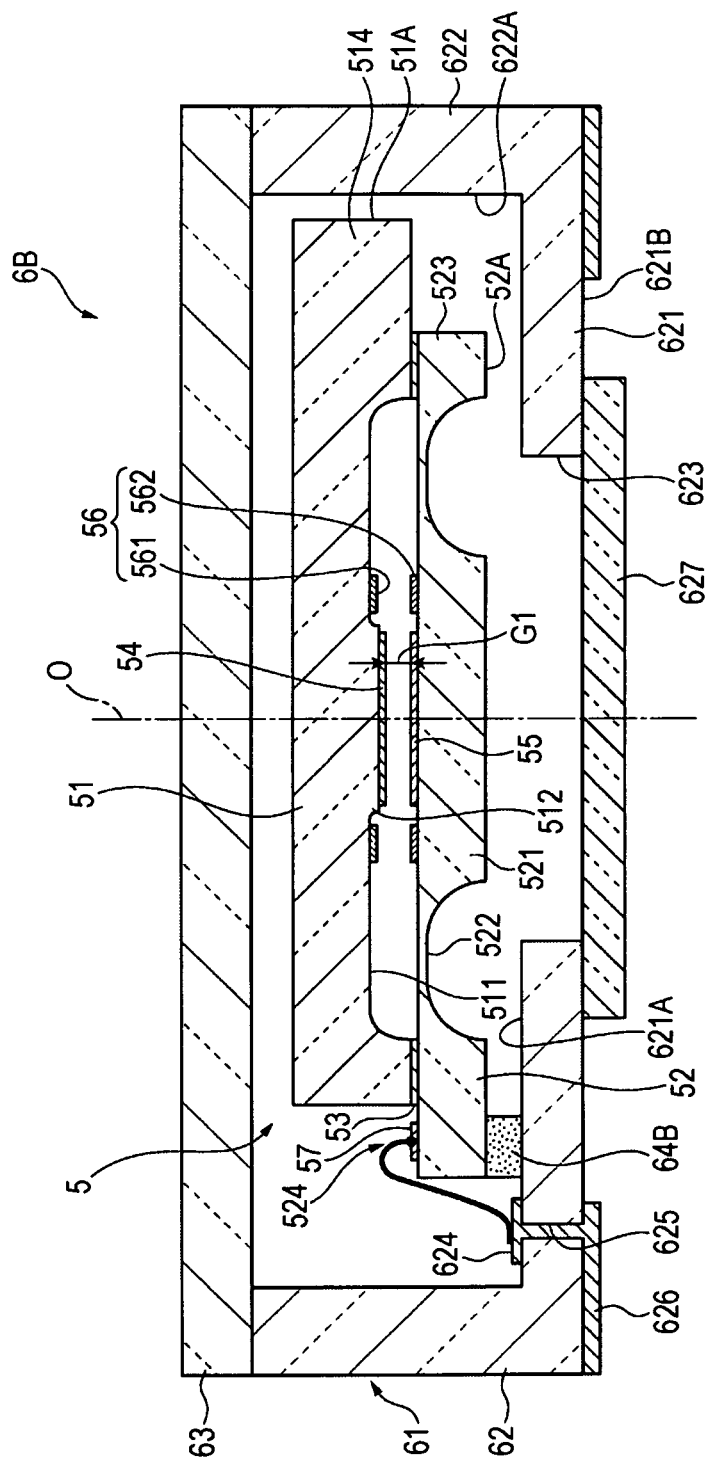
FIG. 17 is a sectional diagram illustrating the schematic configuration of the optical filter device of the second modification example of the invention.

FIG. 16 is a plan view illustrating the schematic configuration of an optical filter device according to the second modification example, and FIG. 17 is a sectional diagram illustrating the schematic configuration of the second modification example.

In an optical filter device 6B according to the second modification example illustrated in FIGS. 16 and 17, a fixing material 64B is provided in two locations along the side C3-C4 of the movable substrate 52. As illustrated in FIG. 17, the fixing material 64B is provided on a surface 52A (a base opposing surface 52A) which faces the base inside surface 621A in the movable substrate 52.

In this case, since the side C3-C4 side on which the electrode pads 57 are provided is fixed, even when the chip vibration is excited by a disturbance or the like, it is possible to suppress an increase in the amplitude amount in the side C3-C4, and it is possible to reduce the load on the wiring caused by the chip vibration.

Third Modification Example of Optical Filter Device

Figure 18:
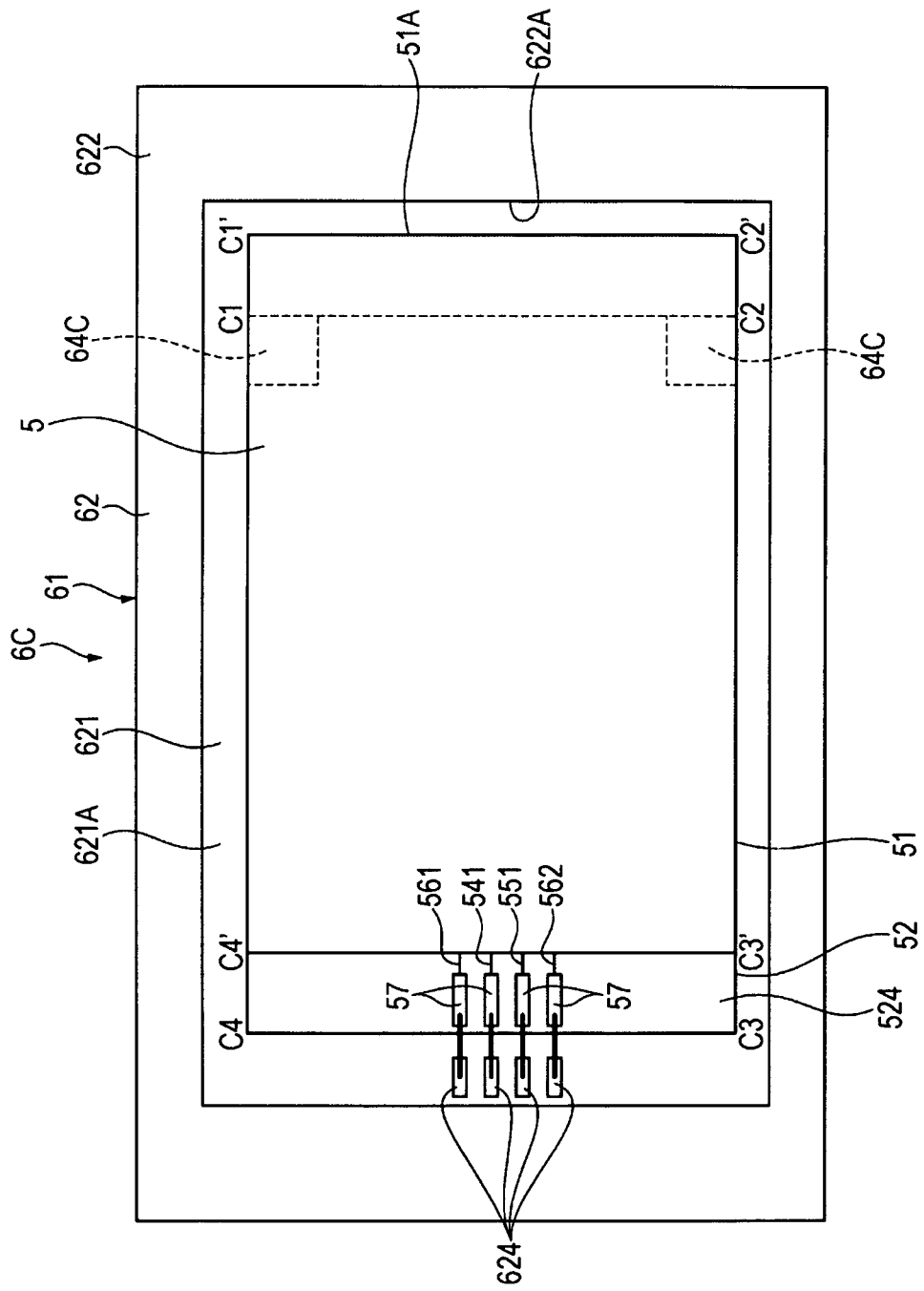
FIG. 18 is a plan view illustrating the schematic configuration of an optical filter device of a third modification example of the invention.
Figure 19:
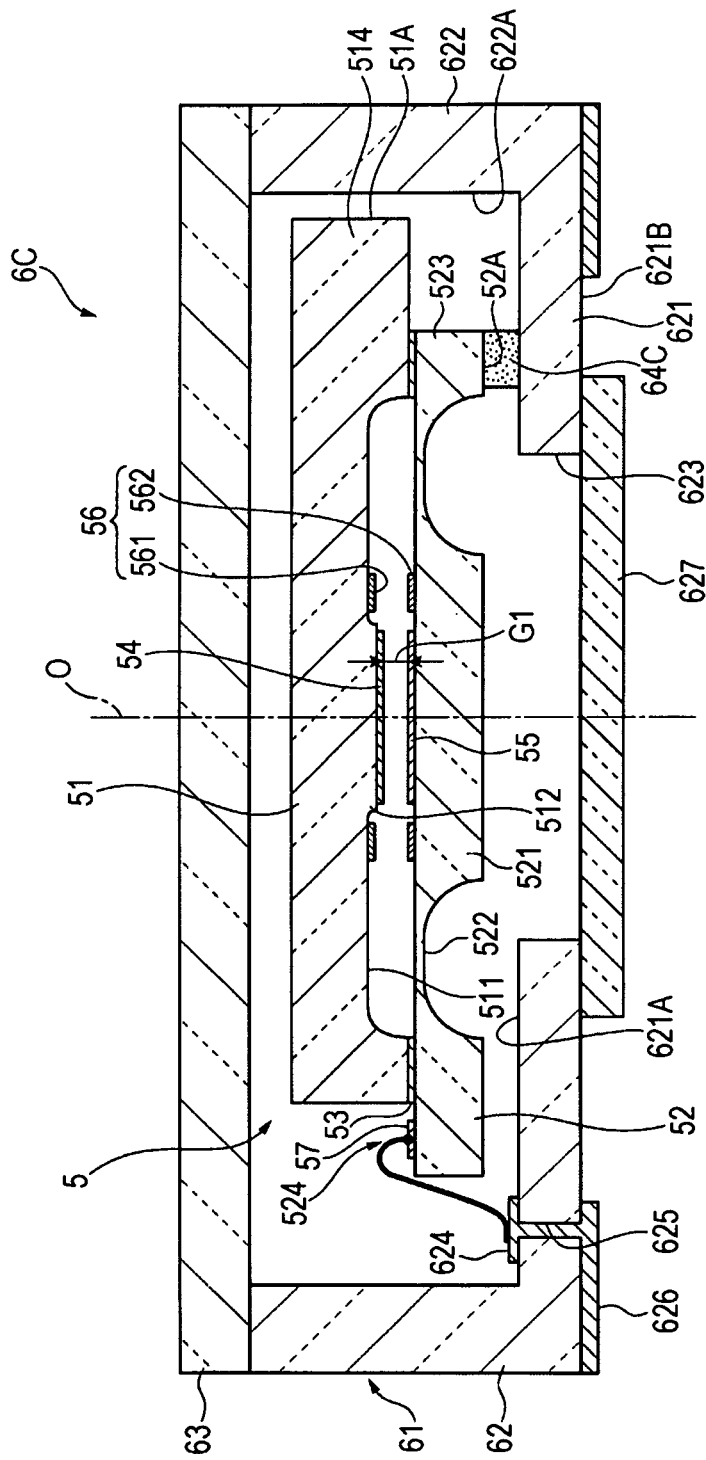
FIG. 19 is a sectional diagram illustrating the schematic configuration of the optical filter device of the third modification example of the invention.

FIG. 18 is a plan view illustrating the schematic configuration of an optical filter device according to the third modification example and FIG. 19 is a sectional diagram illustrating the schematic configuration of the third modification example.

In an optical filter device 6C according to the third modification example illustrated in FIGS. 18 and 19, a fixing material 64C is provided in two locations along the side C1-C2 of the movable substrate 52. As illustrated in FIG. 19, the fixing material 64C is provided on the base opposing surface 52A of the movable substrate 52.

Fourth Modification Example of Optical Filter Device

Figure 20:
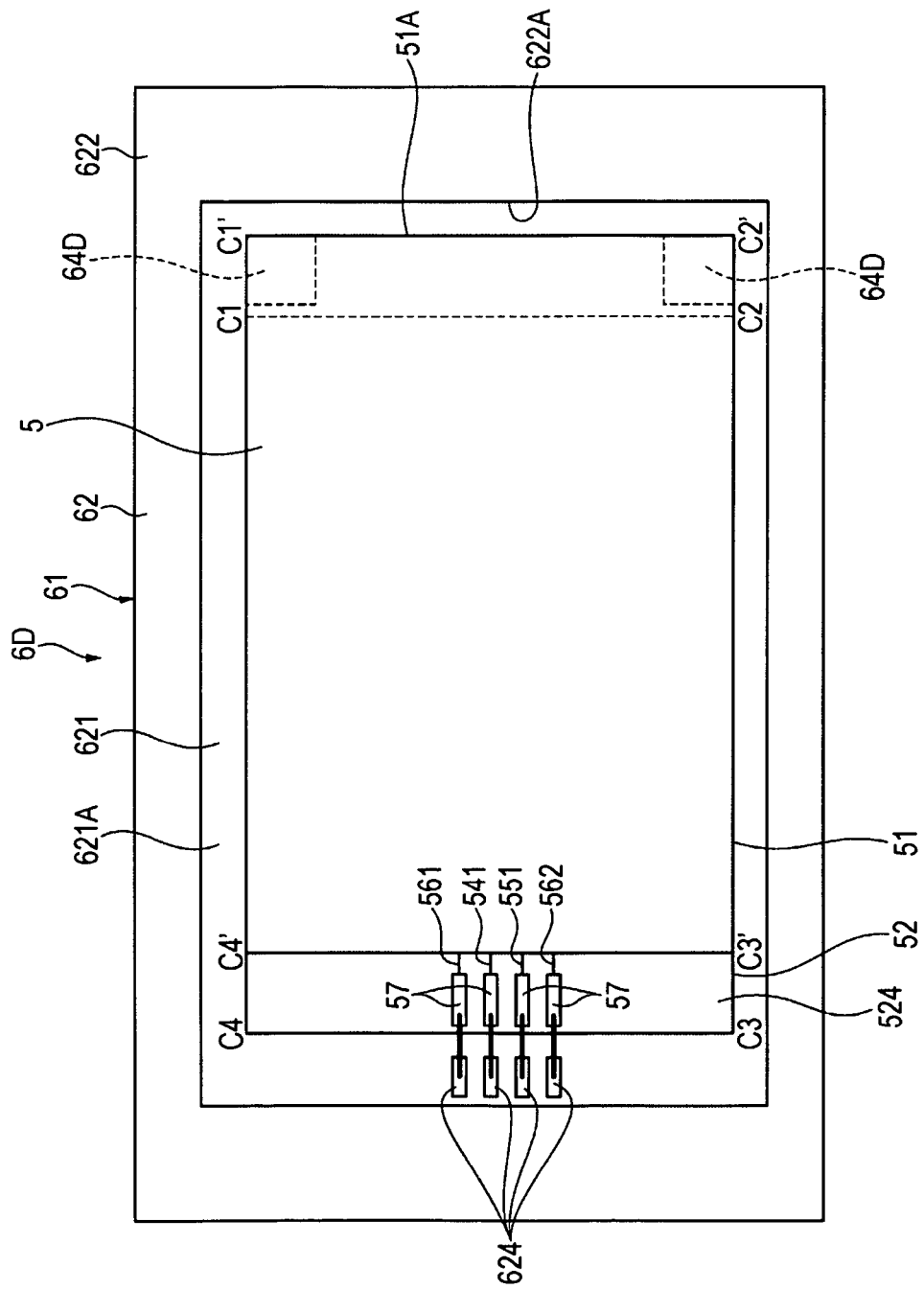
FIG. 20 is a plan view illustrating the schematic configuration of an optical filter device of a fourth modification example of the invention.
Figure 21:
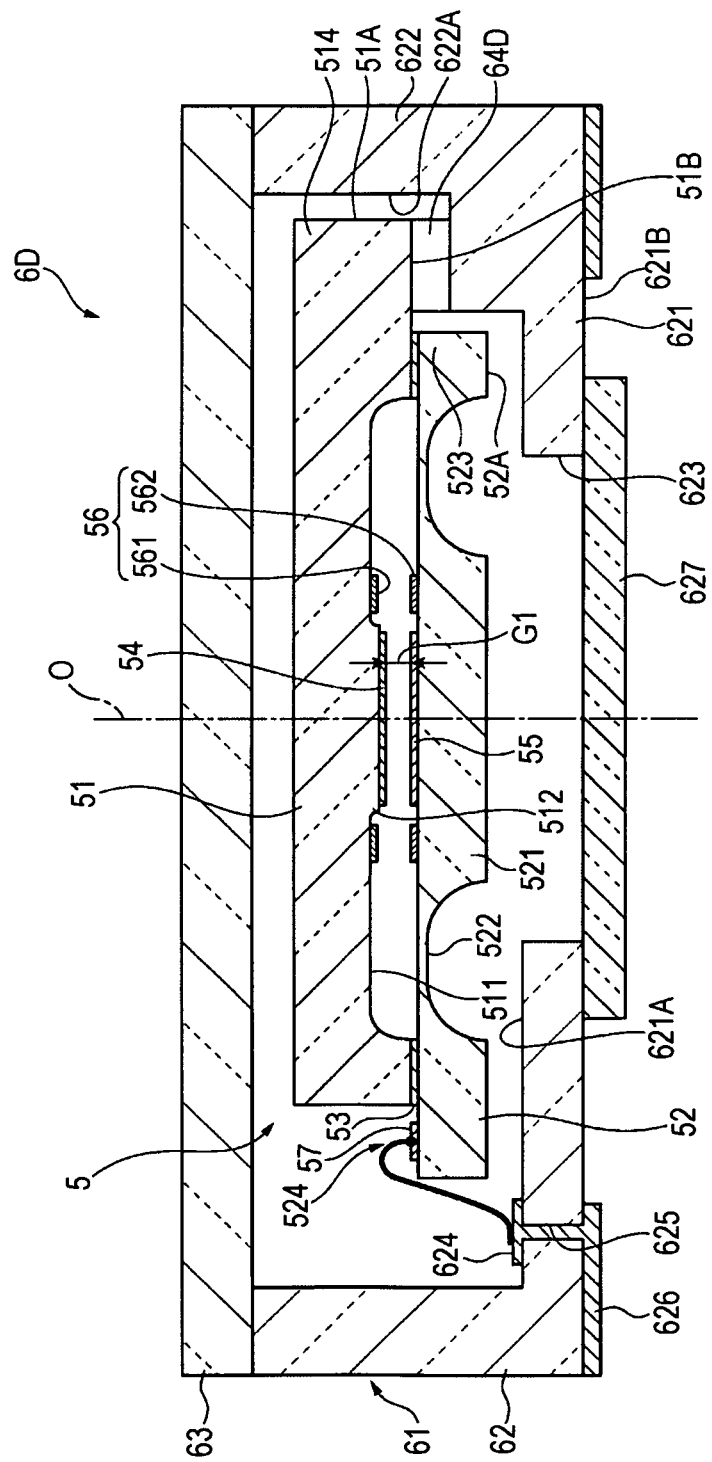
FIG. 21 is a sectional diagram illustrating the schematic configuration of the optical filter device of the fourth modification example of the invention.

FIG. 20 is a plan view illustrating the schematic configuration of an optical filter device according to the fourth modification example, and FIG. 21 is a sectional diagram illustrating the schematic configuration of the fourth modification example.

In an optical filter device 6D according to the fourth modification example illustrated in FIGS. 20 and 21, a fixing material 64D is provided in two locations along the side C1'-C2' of the fixed substrate 51. As illustrated in FIG. 21, the fixing material 64D is provided on a base opposing surface 51B which faces the base inside surface 621A in the fixed substrate 51.

In the fourth modification example, as illustrated in FIG. 21, in the base inside surface 621A, a protruding section which protrudes toward the fixed substrate 51 side is provided on the portion at which the fixing material 64D is provided, and the fixing material 64D is disposed between the protruding section and the fixed substrate 51. Note that, the fixing material 64D may be provided between the base inside surface 621A and the base opposing surface 51B of the fixed substrate 51 without providing the protruding section.

Fifth Modification Example of Optical Filter Device

Figure 22:
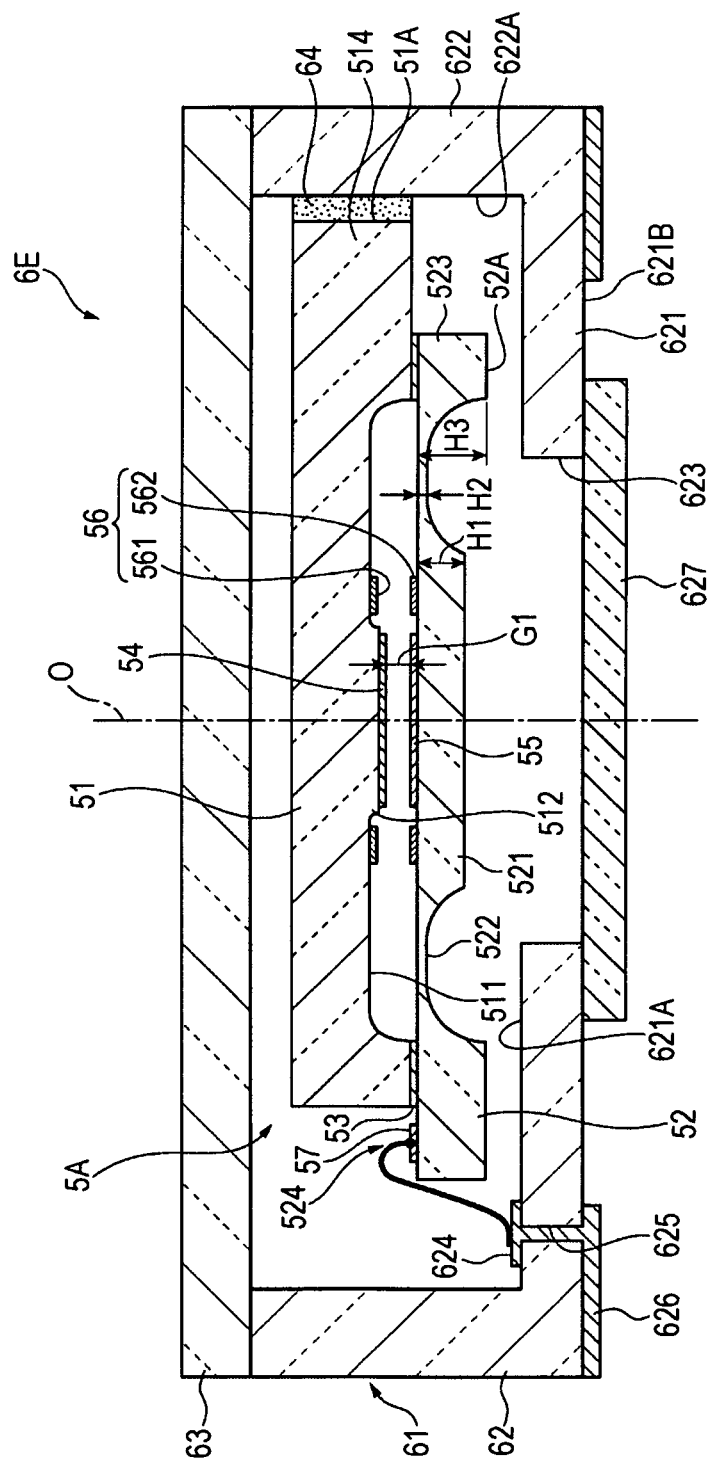
FIG. 22 is a sectional diagram illustrating the schematic configuration of an optical filter device of a fifth modification example of the invention.

FIG. 22 is a sectional diagram illustrating the schematic configuration of an optical filter device of the fifth modification example.

In the embodiment described above, the movable substrate 52 of the variable wavelength interference filter 5 is configured to have a substantially uniform thickness dimension in the movable section 521 and the substrate outer circumferential section 523; however, the invention is not limited to this configuration. In other words, as illustrated in FIG. 22, in an optical filter device 6E according to the fifth modification example, the thickness dimension H1 of the movable section 521 is formed to be greater than the thickness dimension H2 of the holding section 522 and smaller than the thickness dimension H3 of the substrate outer circumferential section 523 (thickness dimension H3 of substrate outer circumferential section 523>thickness dimension H1 of movable section 521>thickness dimension H2 of holding section 522).

By setting the thickness dimension H3 of the substrate outer circumferential section 523 to be greater than the thickness dimension H1 of the movable section 521, it is possible to reduce the mass of the movable section 521, and, it is possible to increase the mass of the movable substrate 52, and it is possible to reduce the ratio of the mass of the movable section 521 to the mass of the variable wavelength interference filter 5 excluding the movable section 521. Accordingly, it is possible to increase the difference between the chip resonance frequency fc and the mirror resonance frequency fm, and it is possible to suppress the resonance between the chip vibration and the mirror vibration.

Other Modification Examples

In the embodiment described above, by adopting a configuration in which the mass M1 is set to less than or equal to a predetermined value (a reduction in the weight of the movable section 521), a configuration in which the spring constant K1 is set to greater than or equal to a predetermined value (an increase in the rigidity of the holding section 522), a configuration in which the mass M2 is set to greater than or equal to a predetermined value (an increase in the mass of the chip), and a configuration in which the spring constant K2 is set to less than or equal to a predetermined value (a decrease in the elasticity of the fixing material 64) at once, the resonance between the chip vibration and the mirror vibration is more reliably suppressed; however, the invention is not limited to a configuration where these are all adopted at once. In other words, a configuration may be used in which at least one of the configurations described above is adopted. Note that, it is possible to set, as appropriate, the upper limit values and the lower limit values of each of the parameters such that the influence of the mirror vibration falls within a permissible range according to the adopted configuration.

In the embodiment described above, in the closed loop system 15L, a configuration is exemplified in which the phase compensation amount caused by the feedback control section 152 is set to −90°; however, the invention is not limited thereto and the phase compensation amount may be set to a value other than −90°. Even in this case, when reducing the phase rotation angle $\theta_{chip}$ caused by the chip resonance, it is possible to set the phase rotation angle $\theta_{chip}$ caused by the chip resonance corresponding to the phase compensation amount of the feedback control section 152 such that the sum of the phase compensation amount of the feedback control section 152 and the phrase change caused by the variable wavelength interference filter 5 do not become −180° (that is, such that the phase rotation angle $\theta_{chip}$ caused by the voltage control section 15 does not exceed 360°).

In the embodiment described above, an attenuation member which attenuates the chip vibration may be disposed in a state of being in contact with the fixed substrate 51 and the movable substrate 52. It is possible to use a high viscosity liquid such as grease or lubrication oil, an elastic body, or the like as the attenuation member. Accordingly, it is possible to suppress the chip resonance, and it is possible to more reliably suppress the excitation (resonance) of the mirror vibration caused by the chip vibration.

In the embodiment described above, as a gap changing section, a configuration is exemplified in which the electrostatic actuator 56 is provided which changes the size of the gap G1 between the reflective films using an electrostatic attraction by applying a voltage to the fixed electrode 561 and the movable electrode 562; however, the invention is not limited thereto.

For example, an induction actuator may be used as the gap changing section. In this case, it is possible to exemplify a configuration in which a first induction coil is disposed instead of the fixed electrode 561, and a second induction coil or a permanent magnet is disposed instead of the movable electrode 562.

A piezoelectric actuator may be used as the gap changing section. In this case, it is possible to exemplify a configuration in which a bottom electrode layer, a piezoelectric film, and a top electrode layer are disposed on the holding section 522 by lamination, and the holding section 522 is caused to flex by causing the piezoelectric film to expand and contract by varying the voltage which is applied across the bottom electrode layer and the top electrode layer as an input value.

In the embodiment described above, each of the reflective films 54 and 55 is used as an electrode of the capacitance detection amount; however, the invention is not limited thereto. For example, separately from each of the reflective films 54 and 55, capacitance detection electrodes which face each other may be provided on the fixed substrate 51 and the movable substrate 52.

As the electronic equipment of the invention, in the embodiment described above, the spectroscopy device 1 is exemplified; however, in addition, it is possible to apply the optical module and the electronic equipment of the invention according to various fields.

For example, it is possible to apply the electronic equipment of the invention to a colorimetry device for measuring colors.

Figure 23:
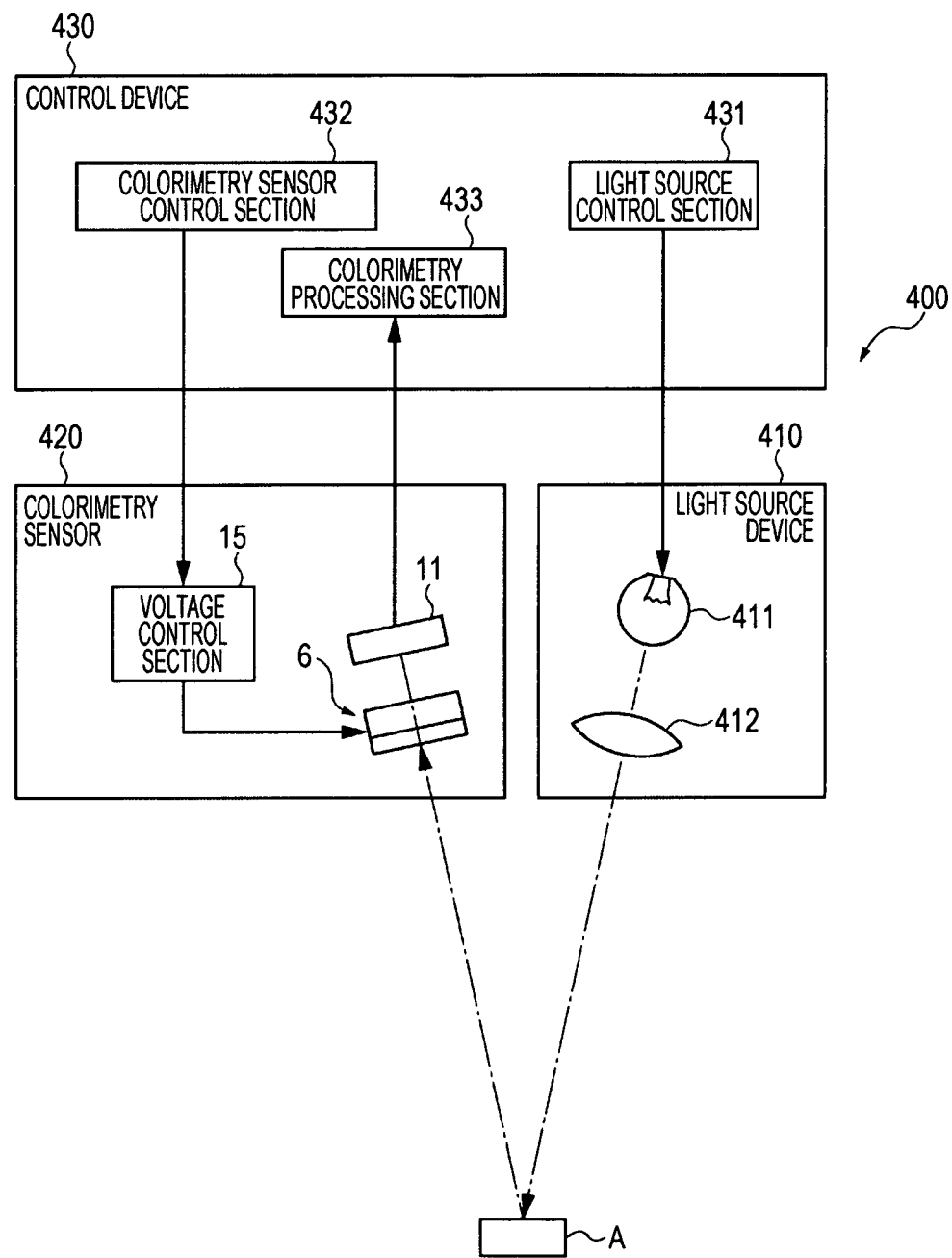
FIG. 23 is a schematic diagram illustrating a colorimetry device which is an example of electronic equipment of the invention.

FIG. 23 is a block diagram illustrating an example of a colorimetry device 400 which is provided with a variable wavelength interference filter.

As illustrated in FIG. 23, the colorimetry device 400 is provided with a light source device 410, a colorimetry sensor 420 (an optical module), and a control device 430 (a processing section). The light source device 410 irradiates an inspection target A with light, and the control device 430 controls the overall operation of the colorimetry device 400. The colorimetry device 400 is a device which causes the light which is emitted from the light source device 410 to be reflected by the inspection target A, receives the reflected inspection target light using the colorimetry sensor 420, and analyzes and measures the chromaticity of the inspection target light, that is, the color of the inspection target A based on a detection signal which is output from the colorimetry sensor 420.

The light source device 410 is provided with a light source 411 and a plurality of lenses 412 (only one is depicted in FIG. 23), and, for example, irradiates the inspection target A with a reference light (for example, white light). A collimator lens is included in the plurality of lenses 412, and in this case, the light source device 410 renders the reference light which is emitted from the light source 411 parallel light using the collimator lens and emits the parallel light from a projection lens (not shown) toward the inspection target A. Note that, in the present embodiment, the colorimetry device 400 which is provided with the light source device 410 is exemplified; however, for example, a configuration may be adopted in which, when the inspection target A is a light emitting member such as a liquid crystal panel, the light source device 410 is not provided.

As illustrated in FIG. 23, the colorimetry sensor 420 is provided with the optical filter device 6, the detector 11, and the voltage control section 15. The variable wavelength interference filter 5 is stored in the optical filter device 6, the detector 11 receives the light which passes through the variable wavelength interference filter 5, and the voltage control section 15 varies the wavelength of light which is allowed to pass through the variable wavelength interference filter 5. The colorimetry sensor 420 is provided with, in a position which faces the variable wavelength interference filter 5, an entrance optical lens (not shown) which guides, to the inner portion thereof, the reflected light (the inspection target light) which is reflected by the inspection target A. Using the variable wavelength interference filter 5, the colorimetry sensor 420 spectrally disperses light of a predetermined wavelength among the inspection target light which is incident from the entrance optical lens, and receives the dispersed light using the detector 11.

The control device 430 controls the overall operation of the colorimetry device 400.

In addition to an ordinary personal computer or a portable information terminal, for example, it is possible to use a colorimetry specialized computer or the like as the control device 430. As illustrated in FIG. 23, the control device 430 is configured to include a light source control section 431, a colorimetry sensor control section 432, a colorimetry processing section 433, and the like.

The light source control section 431 is connected to the light source device 410, outputs a predetermined control signal to the light source device 410 based on a setting input of a user, for example, and emits white light of a predetermined brightness.

The colorimetry sensor control section 432 is connected to the colorimetry sensor 420, sets the wavelength of the light to allow the colorimetry sensor 420 to receive based on a setting input of the user, for example, and outputs a control signal indicating that the received light quantity of the light of the wavelength is to be detected to the colorimetry sensor 420. Accordingly, the voltage control section 15 of the colorimetry sensor 420 applies a voltage to the electrostatic actuator 56 based on the control signal, and drives the variable wavelength interference filter 5.

The colorimetry processing section 433 analyzes the chromaticity of the inspection target A from the received light quantity which is detected by the detector 11.

A light-based system for detecting the presence of a specific material is given as another example of the electronic equipment of the invention. As such a system, it is possible to exemplify a gas detection device such as a vehicle mounted gas leakage detector which detects a specific gas with high sensitivity, an optoacoustic noble gas detector for breath inspection, or the like by adopting a spectroscopic method using the variable wavelength interference filter of the invention, for example.

Hereinafter, description will be given of an example of such a gas detection device provided with a filter based on the drawings.

Figure 24:
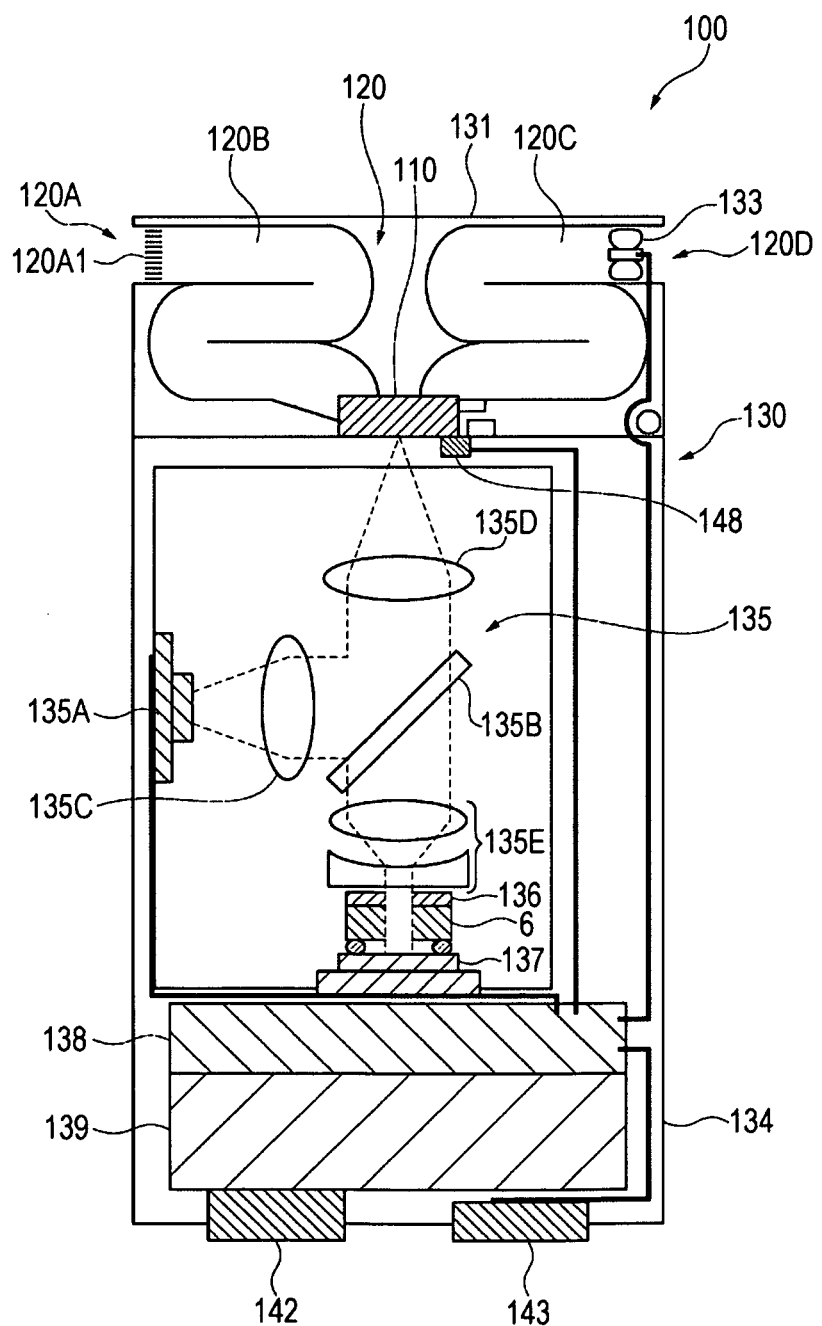
FIG. 24 is a schematic diagram illustrating a gas detection device which is an example of the electronic equipment of the invention.

FIG. 24 is a schematic diagram illustrating an example of a gas detection device which is provided with a variable wavelength interference filter.

Figure 25:
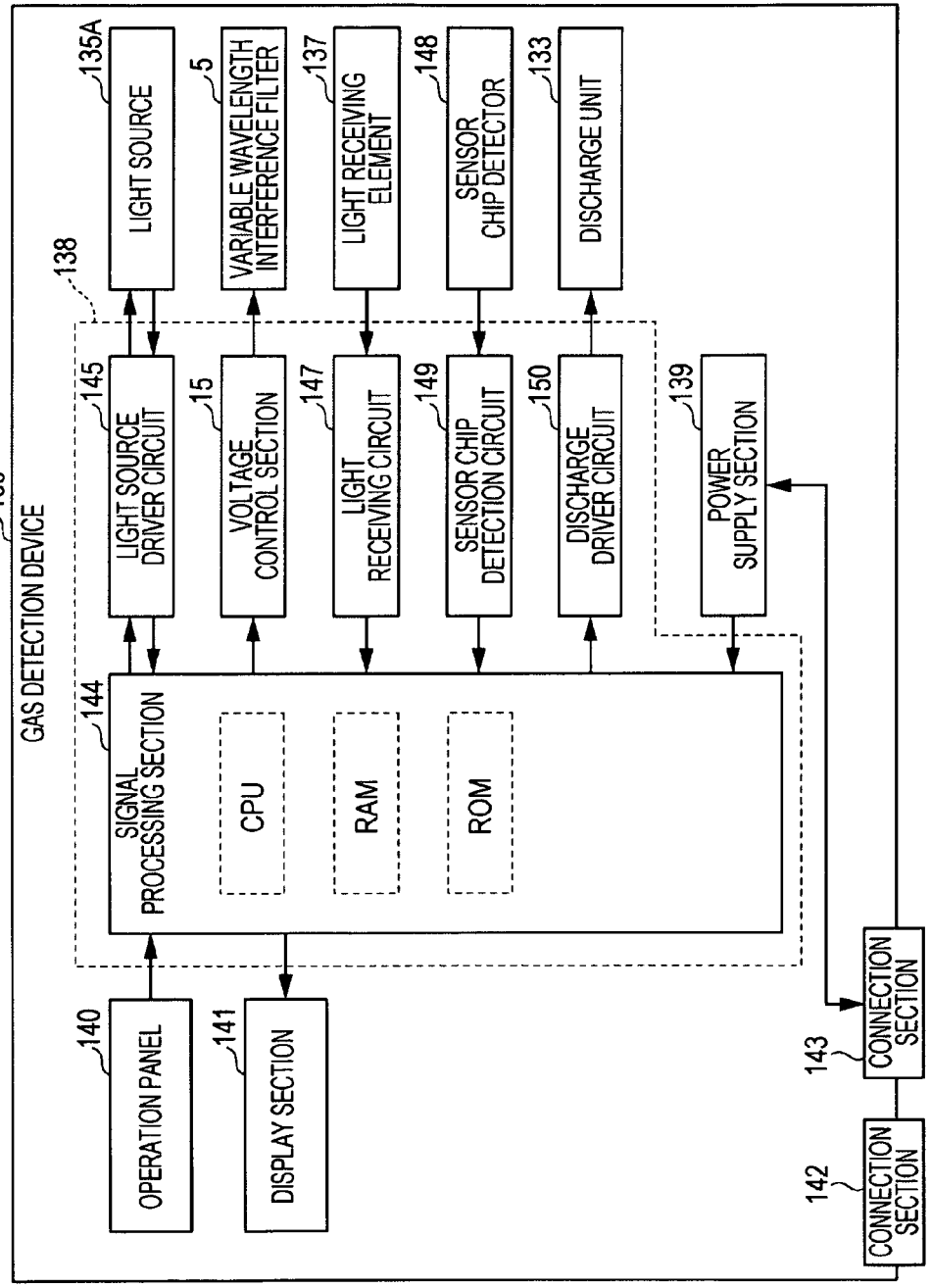
FIG. 25 is a block diagram illustrating the configuration of a control system of the gas detection device of FIG. 24.

FIG. 25 is a block diagram illustrating the configuration of a control system of the gas detection device of FIG. 24.

As illustrated in FIG. 24, the gas detection device 100 is configured to include a sensor chip 110, a flow path 120, and a main body section 130. The flow path 120 is provided with an inlet 120A, an intake flow path 120B, a discharge flow path 120C, and a exhaust port 120D.

The main body section 130 is formed of a detection device (an optical module), a control section 138 (a processing section), a power supply section 139, and the like. The detection device includes a sensor section cover 131, a discharge unit 133, a housing 134, an optical section 135, a filter 136, the optical filter device 6, a light receiving element 137 (a detection section), and the like. The sensor section cover 131 includes an opening which can be attached to and removed from the flow path 120, and the control section 138 controls the detection section, and the power supply section 139 supplies power. The optical section 135 is formed of a light source 135A, a beam splitter 135B, and lenses 135C, 135D, and 135E. The light source 135A emits light, and the beam splitter 135B reflects the light which is incident from the light source 135A to the sensor chip 110 side and allows the light which is incident from the sensor chip 110 side to pass through to the light receiving element 137 side.

As illustrated in FIG. 25, an operation panel 140, a display section 141, a connection section 142, and the power supply section 139 are provided on the surface of the gas detection device 100. The connection section 142 is for interfacing with the outside. The connection section 143 for charging may be provided when the power supply section 139 is a secondary battery.

As illustrated in FIG. 25, the control section 138 of the gas detection device 100 is provided with a signal processing section 144, a light source driver circuit 145, the voltage control section 15, a light receiving circuit 147, a sensor chip detection circuit 149, and a discharge driver circuit 150. The signal processing section 144 is formed of a CPU and the like, the light source driver circuit 145 is for controlling the light source 135A, the voltage control section 15 is for controlling the variable wavelength interference filter 5, the light receiving circuit 147 receives a signal from the light receiving element 137, the sensor chip detection circuit 149 receives a signal from a sensor chip detector 148 which reads a code of the sensor chip 110 and detects whether or not the sensor chip 110 is present, and the discharge driver circuit 150 controls the discharge unit 133.

Next, description will be given hereinafter of the operations of the gas detection device 100 which is described above.

The sensor chip detector 148 is provided in the inner portion of the sensor section cover 131 of the top portion of the main body section 130, and whether or not the sensor chip 110 is present is detected using the sensor chip detector 148. When the signal processing section 144 detects the detection signal from the sensor chip detector 148, the signal processing section 144 determines that the sensor chip 110 is in a mounted state, and outputs a display signal indicating that it is possible to carry out the detection operation to the display section 141.

When the operation panel 140 is operated by a user, for example, and a command signal indicating that the detection process is to be started is output from the operation panel 140 to the signal processing section 144, first, the signal processing section 144 causes the light source 135A to operate by outputting a signal of a light source operation to the light source driver circuit 145. When the light source 135A is driven, laser light which is a single wavelength, linearly polarized, and is stable is emitted from the light source 135A. A temperature sensor, a light quantity sensor, and the like are embedded in the light source 135A, and information thereof is output to the signal processing section 144. When the signal processing section 144 determines that the light source 135A is operating in a stable manner based on the temperature and the light quantity which are input from the light source 135A, the discharge driver circuit 150 is controlled to cause the discharge unit 133 to operate. Accordingly, a gas sample containing the target material (gas molecules) to be detected is guided from the inlet 120A to the intake flow path 120B, inside the sensor chip 110, the discharge flow path 120C, and the exhaust port 120D. Note that, a dust removal filter 120A1 is provided in the inlet 120A, and comparatively large dust particles, a portion of water vapor, and the like are removed.

A plurality of metal nano-structure bodies are embedded in the sensor chip 110, which is a sensor that uses localized surface plasmon resonance. In the sensor chip 110, an enhanced electric field is formed between the metal nano-structure bodies using the laser light, when gas molecules enter the enhanced electric field, Raman scattered light containing information of the molecule vibration, and Rayleigh scattered light are generated.

The Rayleigh scattered light and the Raman scattered light pass through the optical section 135 and enter the filter 136, the Rayleigh scattered light is separated by the filter 136 and the Rayleigh scattered light enters the variable wavelength interference filter 5. The signal processing section 144 outputs a control signal to the voltage control section 15. Accordingly, the voltage control section 15 applies a feedback voltage to the electrostatic actuator 56 such that the Raman scattered light corresponding to the gas molecules which are the detection target pass through the variable wavelength interference filter 5.

Subsequently, when the spectrally dispersed light is received by the light receiving element 137, the light reception signal corresponding to the received light quantity is output to the signal processing section 144 via the light receiving circuit 147. In this case, it is possible to precisely extract the intended Raman scattered light from the variable wavelength interference filter 5.

The signal processing section 144 compares spectral data of the Raman scattered light, which is obtained as described above and corresponds to the gas molecules which are the detection target, with the data which is stored in a ROM, determines whether or not the gas molecules are the intended gas molecules, and performs the specification of the material. The signal processing section 144 causes the result information to be displayed on the display section 141, outputs the result information to the outside from the connection section 142, and the like.

Note that, in FIGS. 24 and 25, the gas detection device 100 which spectrally disperses the Raman scattered light using the variable wavelength interference filter 5 and performs gas detection from the dispersed Raman scattered light is exemplified; however, it is possible to use a gas detection device which specifies the gas type by detecting the gas-specific absorbance as the gas detection device. In this case, a gas sensor in which a gas is allowed to flow into the inner portion of the sensor which detects the light, among the incident light, which is absorbed by the gas is used as the optical module of the invention. The gas detection device which analyzes and distinguishes a gas which flows into the sensor using a gas sensor in this manner is used as the electronic equipment of the invention. Even with this configuration, it is possible to detect a component of the gas using the variable wavelength interference filter.

As the system for detecting the presence of a specific material, the invention is not limited to the detection of a gas as described above, and it is possible to exemplify a noninvasive measurement device of sugar using near infrared light, and a material component analysis device such as a noninvasive measurement device of information of foodstuffs, organisms, minerals, and the like.

Hereinafter, description will be given of a foodstuff analysis device as an example of the material component analysis device.

Figure 26:
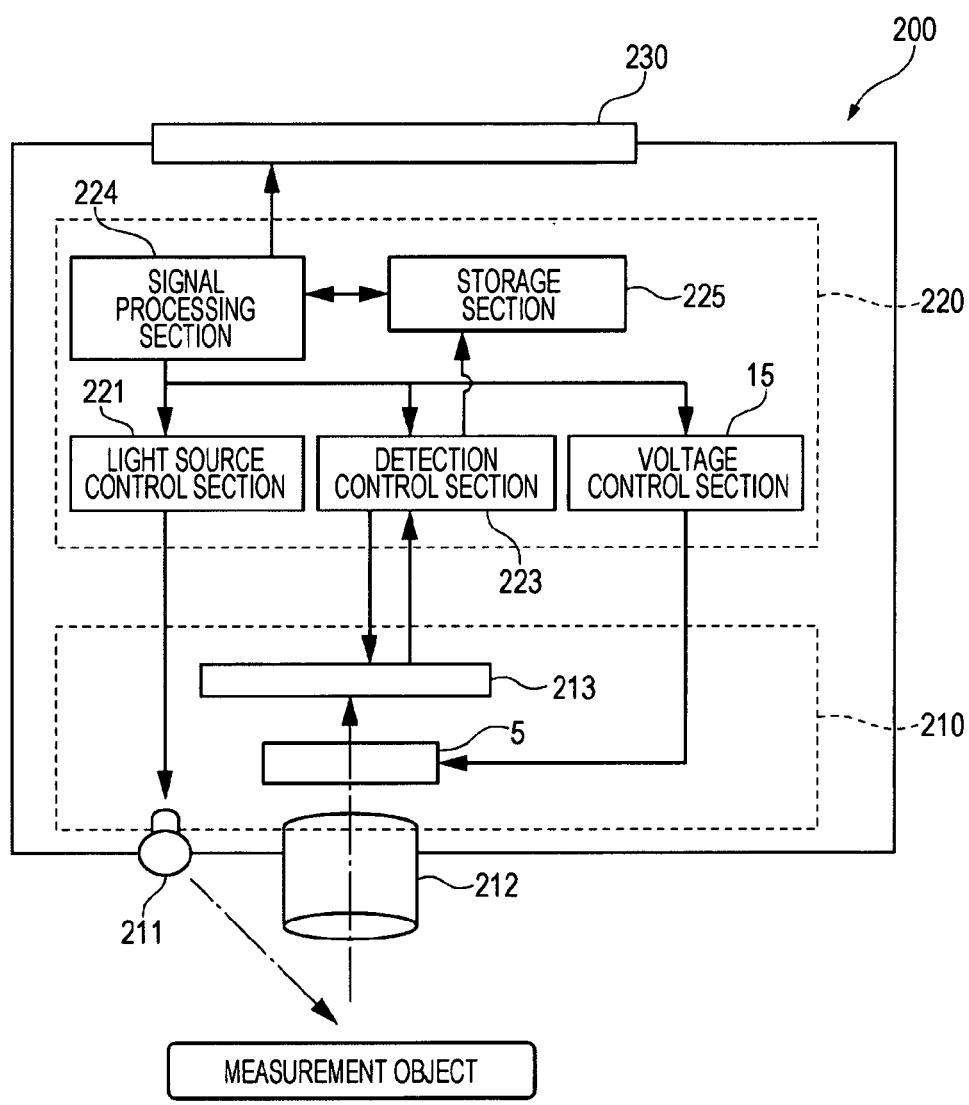
FIG. 26 is a diagram illustrating the schematic configuration of a foodstuff analysis device which is an example of the electronic equipment of the invention.

FIG. 26 is a diagram illustrating the schematic configuration of a foodstuff analysis device which is an example of the electronic equipment which uses the variable wavelength interference filter 5.

As illustrated in FIG. 26, a foodstuff analysis device 200 is provided with a detector 210 (an optical module), a control section 220, and a display section 230. The detector 210 is provided with a light source 211, an imaging lens 212, the optical filter device 6, and an imaging section 213. The light source 211 emits light, light from the measurement object enters the imaging lens 212, the variable wavelength interference filter 5 which spectrally disperses the light which is guided thereto from the imaging lens 212 is stored in the optical filter device 6, and the imaging section 213 detects the dispersed light.

The control section 220 is provided with a light source control section 221, the voltage control section 15, a detection control section 223, a signal processing section 224 (an analysis section), and a storage section 225. The light source control section 221 carries out the control of the switching the light source 211 on or off and the control of the brightness when the light source 211 is turned on, the voltage control section 15 controls the variable wavelength interference filter 5, and the detection control section 223 controls the imaging section 213 and acquires a spectrally dispersed image which is captured by the imaging section 213.

In the foodstuff analysis device 200, when the system is driven, the light source 211 is controlled by the light source control section 221 and the measurement object is irradiated with the light from the light source 211. The light which is reflected by the measurement object passes through the imaging lens 212 and enters the variable wavelength interference filter 5. Accordingly, it is possible to precisely extract light of the intended wavelength from the variable wavelength interference filter 5. The extracted light is imaged by the imaging section 213 which is formed of a CCD camera or the like, for example. The imaged light is accumulated as a spectrally dispersed image in the storage section 225. The signal processing section 224 controls the voltage control section 15 to change the voltage value which is applied to the variable wavelength interference filter 5 and acquires the spectrally dispersed image for each wavelength.

The signal processing section 224 subjects the data of each pixel in each image which is accumulated in the storage section 225 to a computation process and obtains the spectrum in each pixel. Information relating to the components of the foodstuff in relation to the spectrum, for example, is stored in the storage section 225, and the signal processing section 224 analyses the obtained spectral data based on the information relating to the foodstuff which is stored in the storage section 225, and obtains the foodstuff components and the content amounts thereof contained in the detection target. It is possible to calculate the foodstuff calories, the freshness, and the like from the obtained foodstuff components and content amounts. By analyzing the spectral distribution in the images, it is possible to carry out extraction of a portion in the inspection target foodstuff in which the freshness is reduced, and further, it is possible to carry out detection of foreign matter and the like contained in the foodstuff.

The signal processing section 224 performs a process of causing the display section 230 to display information of the components, content amounts, calories, freshness, and the like of the inspection target foodstuff which are obtained as described above.

In FIG. 26, an example of the foodstuff analysis device 200 is illustrated; however, according to substantially the same configuration, it is possible to use the invention as a noninvasive measurement device of other information as described above. For example, it is possible to use the invention as an organism analysis device which analyses organism components such as measuring and analyzing body fluid components such as blood. As the organism analysis device, for example, as a device which measures a body fluid component such as blood, if a device which detects ethyl alcohol is used, it is possible to use the invention as a device for preventing driving under the influence of liquor which detects the liquor intake state of a driver. It is possible to use the invention as an electronic endoscopic system which is provided with the organism analysis device.

It is possible to use the invention as a mineral analysis device which carries out component analysis of minerals.

As the variable wavelength interference filter, the optical module, and the electronic equipment of the invention, it is possible to apply the invention to the following devices.

For example, it is possible to transmit data using the light of each wavelength by changing the intensity of light of each wavelength over time, and, in this case, it is possible to extract data which is transmitted by the light of the specific wavelength by spectrally dispersing the light of a specific wavelength using the variable wavelength interference filter which is provided in the optical module and causing a light reception section to receive the light, and it is possible to carry out optical communication by processing the data of the light of each wavelength using the electronic equipment which is provided with an optical module for such data extraction.

As the electronic equipment, it is possible to apply the invention to a spectroscopic camera which images a spectrally dispersed image, a spectroscopic analyzer, or the like by spectrally dispersing light using the variable wavelength interference filter of the invention. An infrared camera with the variable wavelength interference filter embedded therein is an example of the spectroscopic camera.

Figure 27:
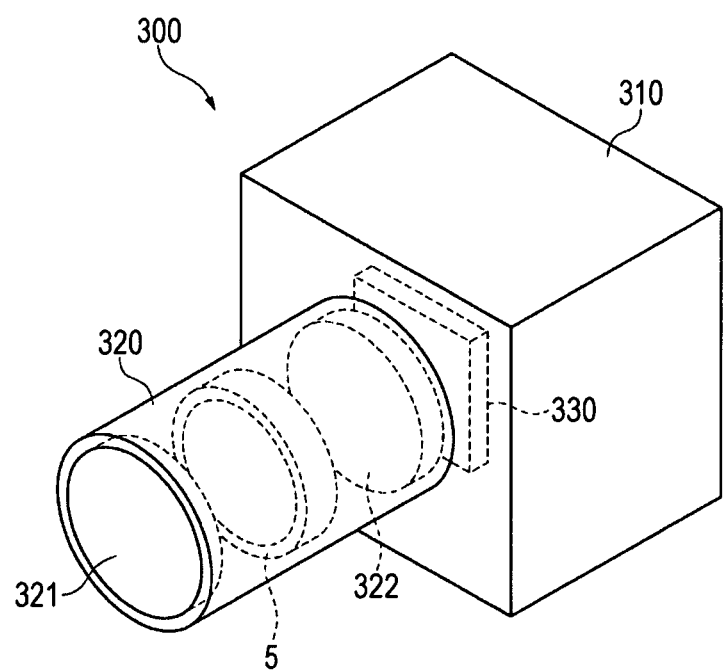
FIG. 27 is a diagram illustrating the schematic configuration of a spectroscopic camera which is an example of the electronic equipment of the invention.

FIG. 27 is a schematic diagram illustrating the schematic configuration of the spectroscopic camera. As illustrated in FIG. 27, a spectroscopic camera 300 is provided with a camera main body 310, an imaging lens unit 320, and an imaging section 330.

The camera main body 310 is a portion which is gripped and operated by a user.

The imaging lens unit 320 is provided in the camera main body 310 and guides the incident image light to the imaging section 330. As illustrated in FIG. 27, the imaging lens unit 320 is configured to include an objective lens 321, an image-forming lens 322, and the optical filter device 6 in which the variable wavelength interference filter 5 which is provided between these lenses is stored.

The imaging section 330 is formed of a light receiving element and captures image light which is guided by the imaging lens unit 320.

In the spectroscopic camera 300, it is possible to capture the spectrally dispersed image of the light of a desired wavelength by allowing light of a wavelength which is the imaging target to pass through using the variable wavelength interference filter 5.

The optical filter device of the invention may be used as a bandpass filter. For example, the optical filter device of the invention may be used as an optical laser device which, using the variable wavelength interference filter, spectrally disperses only light of a narrow band around a predetermined wavelength, of light of a predetermined wavelength region which is emitted by the light emitting element, and allows the dispersed light to pass through.

The optical filter device of the invention may be applied to a biometric identification device. For example, it is possible to apply the invention to an identification device of blood vessels, fingerprints, retina, and the like using light of a near infrared region or a visible region.

It is possible to use the optical module and the electronic equipment as a concentration detection device. In this case, infrared energy (infrared rays) which is emitted from a material is spectrally dispersed and a concentration of a subject in a sample is measured using the variable wavelength interference filter.

As described above, the optical filter device, the optical module, and the electronic equipment of the invention can also be applied to any device which spectrally disperses predetermined light from incident light.

In addition, the specific structure when carrying out the invention can be changed, as appropriate, to another structure or the like within a scope in which an advantage of the invention can be achieved. The modification examples may be combined and applied to the embodiment described above.

The entire disclosure of Japanese Patent Application No. 2014-264020 filed on Dec. 26, 2014 is expressly incorporated by reference herein.

What is claimed is:

1. An optical filter device, comprising:
an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film;
a base section to which the interference filter is fixed; and
a fixing member which fixes at least one of the first substrate and the second substrate to the base section via at least one fixing position that is located at one surface side along a substrate thickness direction of the one of the first substrate and the second substrate,
wherein the fixing member has an elastic modulus of less than or equal to a first threshold at which the fixing member elastically deforms due to a stress that corresponds to a rotation of the interference filter that centers on the fixing position such that a first order resonance frequency of the interference filter in which the fixing position of the fixing member is used as a fixed end is less than or equal to half a value of a first order resonance frequency of the movable section.

2. The optical filter device according to claim 1,
wherein a ratio of a mass of the movable section to a mass of the interference filter excluding the movable section is less than or equal to a second threshold at which the first order resonance frequency of the interference filter is set to half a value of the one-dimensional resonance frequency of the movable section.

3. The optical filter device according to claim 1,
wherein the second substrate includes a holding section which holds the movable section, and the movable section approaches and withdraws from the first substrate corresponding to deformation of the holding section, and
wherein, when a mass of the interference filter is X times a mass of the movable section, a rigidity of the fixing member is less than a value obtained by multiplying a rigidity of the holding section by X/4.

4. An optical module, comprising:
an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film;
a base section to which the interference filter is fixed;
a fixing member which fixes at least one of the first substrate and the second substrate to the base section via at least one fixing position that is located at one surface side along a substrate thickness direction of the one of the first substrate and the second substrate; and
a detection section which detects light extracted by the interference filter, wherein the fixing member has an elastic modulus of less than or equal to a first threshold at which the fixing member elastically deforms due to a stress that corresponds to a rotation of the interference filter that centers on the fixing position such that a first order resonance frequency of the interference filter in which the fixing position of the fixing member is used as a fixed end is less than or equal to half a value of a first order resonance frequency of the movable section.

5. The optical module according to claim 4, wherein the interference filter includes the gap changing section which changes the gap dimension between the first reflective film and the second reflective film by causing the movable section to approach and withdraw, and wherein the optical module further comprises a feedback loop which includes the interference filter, a gap detection section that detects a gap dimension between the first reflective film and the second reflective film, and a feedback control section that applies a feedback voltage corresponding to a detection result of the gap detection section and a target value of the gap dimension to a gap changing section.

6. Electronic equipment, comprising:

an interference filter which includes a first substrate, a second substrate facing the first substrate and having a movable section that approaches and withdraws from the first substrate, a first reflective film provided on the first substrate, and a second reflective film provided on the movable section of the second substrate and facing the first reflective film;

a base section to which the interference filter is fixed;

a fixing member which fixes at least one of the first substrate and the second substrate to the base section via at least one fixing position that is located at one surface side along a substrate thickness direction of the one of the first substrate and the second substrate; and a processing section which carries out a process based on light extracted by the interference filter, wherein the fixing member has an elastic modulus of less than or equal to a first threshold at which the fixing member elastically deforms due to a stress that corresponds to a rotation of the interference filter that centers on the fixing position such that a first order resonance frequency of the interference filter in which the fixing position of the fixing member is used as a fixed end is less than or equal to half a value of a first order resonance frequency of the movable section.

* * * * *